(12) United States Patent
Kim et al.

(10) Patent No.: US 11,990,998 B2
(45) Date of Patent: May 21, 2024

(54) PUNCTURING PATTERN FOR HARQ-IR RETRANSMISSION

(71) Applicant: LG ELECTRONICS INC., Seoul (KR)

(72) Inventors: Jinmin Kim, Seoul (KR); Jinsoo Choi, Seoul (KR); Dongguk Lim, Seoul (KR); Eunsung Park, Seoul (KR); Sunwoong Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 342 days.

(21) Appl. No.: 17/310,872

(22) PCT Filed: Nov. 22, 2019

(86) PCT No.: PCT/KR2019/016173
§ 371 (c)(1),
(2) Date: Aug. 27, 2021

(87) PCT Pub. No.: WO2020/197033
PCT Pub. Date: Oct. 1, 2020

(65) Prior Publication Data
US 2022/0149990 A1 May 12, 2022

(30) Foreign Application Priority Data
Mar. 27, 2019 (KR) .................. 10-2019-0035071

(51) Int. Cl.
*H04L 1/08* (2006.01)
*H04L 1/00* (2006.01)
*H04W 84/12* (2009.01)

(52) U.S. Cl.
CPC .............. *H04L 1/08* (2013.01); *H04L 1/0059* (2013.01); *H04L 1/0069* (2013.01); *H04W 84/12* (2013.01)

(58) Field of Classification Search
CPC ....... H04L 1/08; H04L 1/0059; H04L 1/1896; H04L 1/1819; H04W 84/12
See application file for complete search history.

(56) References Cited

U.S. PATENT DOCUMENTS

| 7,280,606 | B2 | 10/2007 | Kim et al. |
| 8,670,318 | B2 | 3/2014 | Komura |
| 9,742,433 | B2 | 8/2017 | Lee et al. |
| 2017/0207881 | A1 | 7/2017 | Shen et al. |
| 2020/0052832 | A1* | 2/2020 | Tian ................ H04L 1/1614 |
| 2020/0287660 | A1* | 9/2020 | Suh ................. H04L 1/0059 |
| 2020/0412378 | A1* | 12/2020 | Lee ............... H03M 13/6362 |
| 2021/0399838 | A1* | 12/2021 | Lou ..................... H04L 1/08 |

FOREIGN PATENT DOCUMENTS

WO    2009015170    1/2009

OTHER PUBLICATIONS

PCT International Application No. PCT/KR2019/016173, International Search Report dated Feb. 28, 2020, 4 pages.

* cited by examiner

*Primary Examiner* — Donald L Mills
(74) *Attorney, Agent, or Firm* — LEE, HONG, DEGERMAN, KANG & WAIMEY

(57) ABSTRACT

In a wireless local area network system, a station (STA) may perform binary convolutional code (BCC) encoding on a data field. The STA may puncture the data field in a first puncturing pattern and may transmit a physical protocol data unit (PPDU) including a control field and the data field. The control field may include control information related to the first puncturing pattern.

8 Claims, 27 Drawing Sheets

PUNCTURING PATTERN FOR HARQ-IR RETRANSMISSION

CROSS-REFERENCE TO RELATED APPLICATIONS

This application is the National Stage filing under 35 U.S.C. 371 of International Application No. PCT/KR2019/016173, filed on Nov. 22, 2019, which claims the benefit of earlier filing date and right of priority to Korean Application No. 10-2019-0035071, filed on Mar. 27, 2019, the contents of which is hereby incorporated by reference herein in its entirety.

BACKGROUND OF THE DISCLOSURE

Field of the Disclosure

The present specification relates to a puncturing pattern for hybrid automatic repeat request-incremental redundancy (HARQ-IR) retransmission in a wireless local area network (WLAN) system.

Related Art

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

This disclosure proposes technical features that improve the legacy WLAN or that may be utilized in a new communication standard. For example, the new communication standard may be an extreme high throughput (EHT) standard which has lately been under discussion. The EHT standard may use a newly proposed increased bandwidth, an improved physical (PHY) protocol data unit (PPDU) structure, an improved sequence, a hybrid automatic repeat request (HARQ) technique, and a multi-link.

SUMMARY

A method performed in a wireless local area network (WLAN) system according to various embodiments of the present disclosure is related to a technical feature in which a station (STA) performs puncturing for hybrid automatic repeat request-incremental redundancy (HARQ-IR) retransmission. For example, the STA may perform a binary convolutional code (BCC) encoding on the data field. The STA may puncture the data field in a first puncturing pattern and may transmit a physical protocol data unit (PPDU) including a control field and the data field. The control field may include control information related to the first puncturing pattern.

According to an example according to the present specification, a transmitting STA supporting HARQ-IR may transmit information related to a pattern in which a data field is punctured together with a data field. Accordingly, the receiving STA may know in which pattern the data field is punctured. In addition, according to an example according to the present specification, it is possible to improve a channel coding gain by using the proposed puncturing pattern.

DESCRIPTION OF EXEMPLARY EMBODIMENTS

In the present specification, a slash (/) or comma may indicate "and/or". For example, "A/B" may indicate "A and/or B," and therefore may mean "only A", "only B", or "A and B". Technical features that are separately described in one drawing may be implemented separately or may be implemented simultaneously.

In the present specification, parentheses may indicate "for example." Specifically, "control information (EHT-Signal)" may mean that the "EHT-Signal" is proposed as an example of the "control information". Further, "control information (i.e., EHT-Signal)" may also mean that the "EHT-Signal" is proposed as an example of the "control information."

The following examples of the present specification may be applied to various wireless communication systems. For example, the following examples of the present specification may be applied to a wireless local area network (WLAN) system. For example, the present specification may be applied to IEEE 802.11a/g/n/ac or IEEE 802.11ax. The present specification may also be applied to a newly proposed EHT standard or IEEE 802.11be. Further, the present specification may be applied to a new WLAN stand which has enhanced IEEE 802.11be.

Hereinafter, technical features of a WLAN system to which the present specification is applicable are described in order to describe technical features of the present specification.

Figure 1:
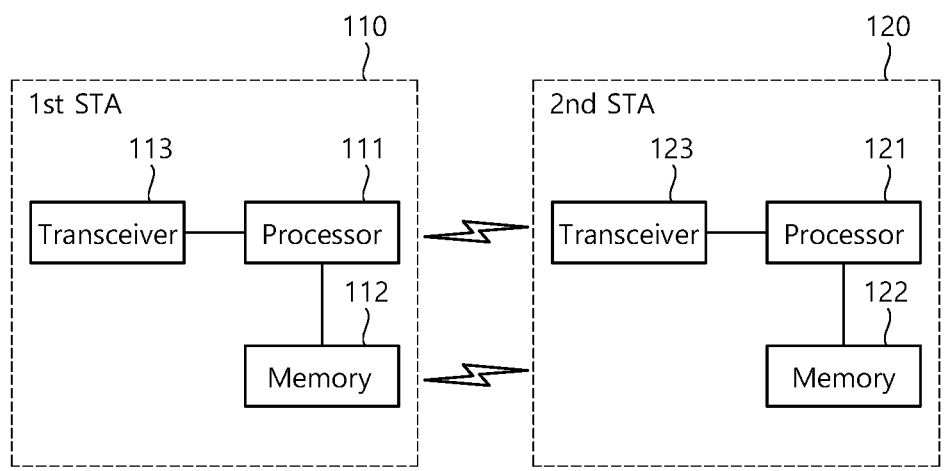
FIG. 1 illustrates an example of a transmitting device and/or a receiving device according to the present disclosure.

FIG. 1 shows an example of a transmitting apparatus and/or receiving apparatus of the present specification.

In the example of FIG. 1, various technical features described below may be performed. FIG. 1 relates to two stations (STAs). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. Further, the STAs 110 and 120 of the present specification may also be referred to as various names such as a receiving apparatus, a transmitting apparatus, a receiving STA, a transmitting STA, a receiving device, a transmitting device, or the like.

The STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like.

The STAs 110 and 120 of the present specification may include a medium access control (MAC) conforming to the IEEE 802.11 standard and a physical layer interface for a radio medium.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110.

For example, in the specification described below, an operation of a device indicated as a non-AP (or user-STA) may be performed in the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120.

Figure 2:
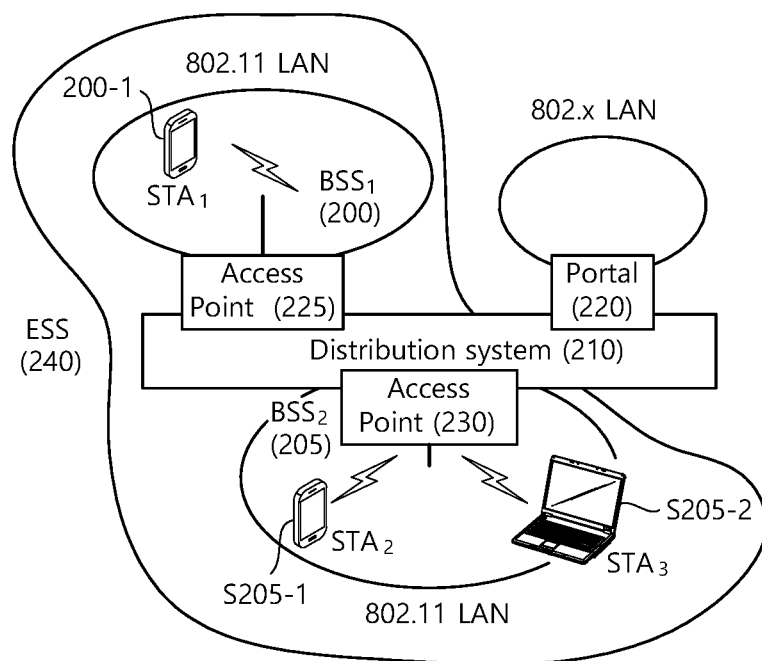
FIG. 2 is a conceptual diagram illustrating the structure of a wireless local area network (WLAN).
Figure 2:
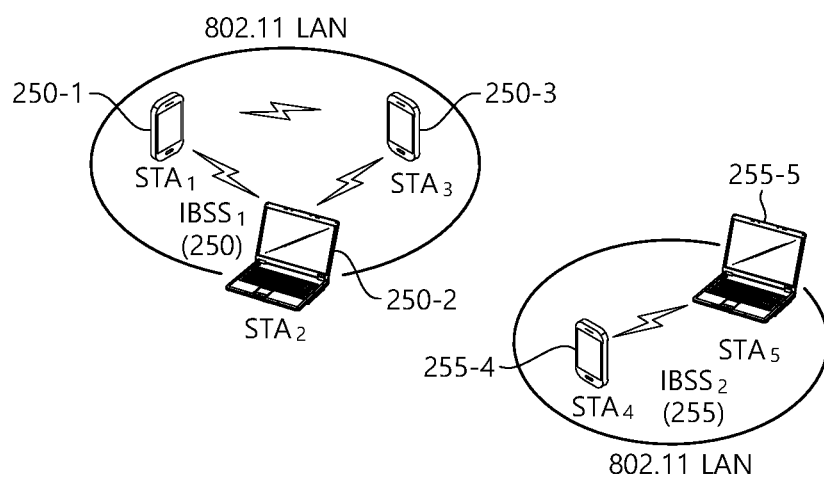

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
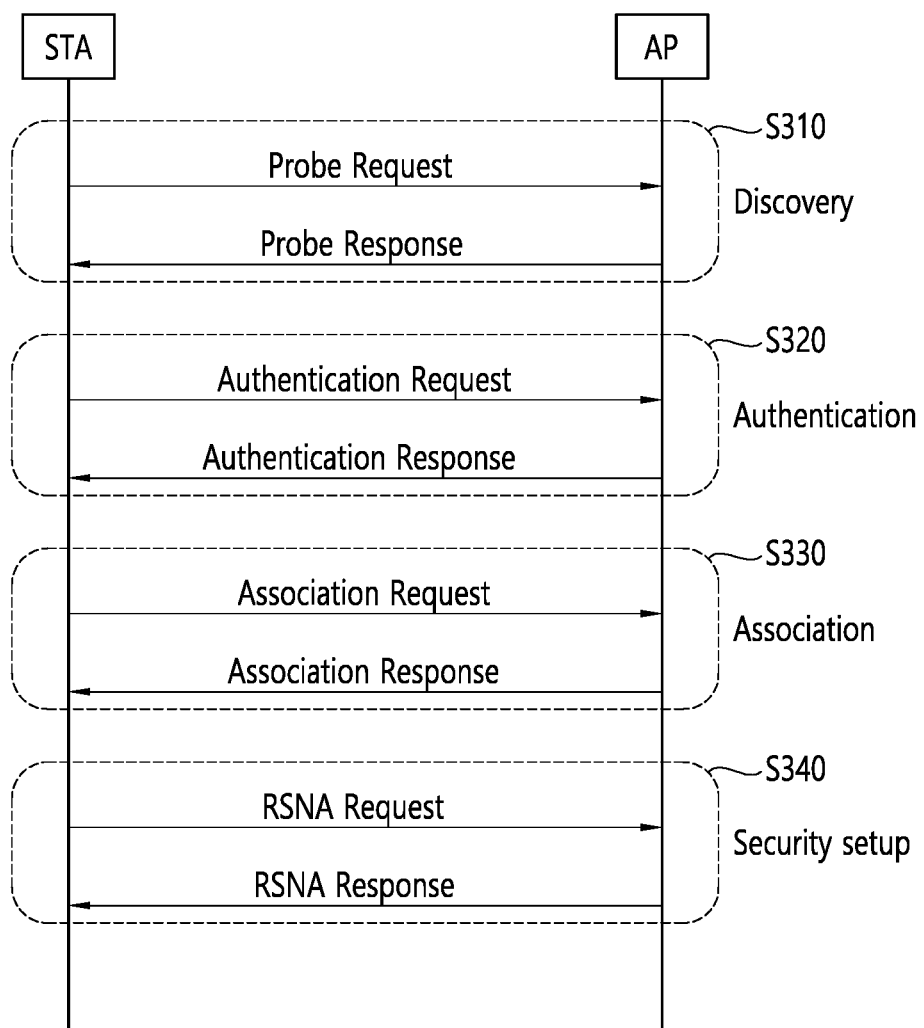
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
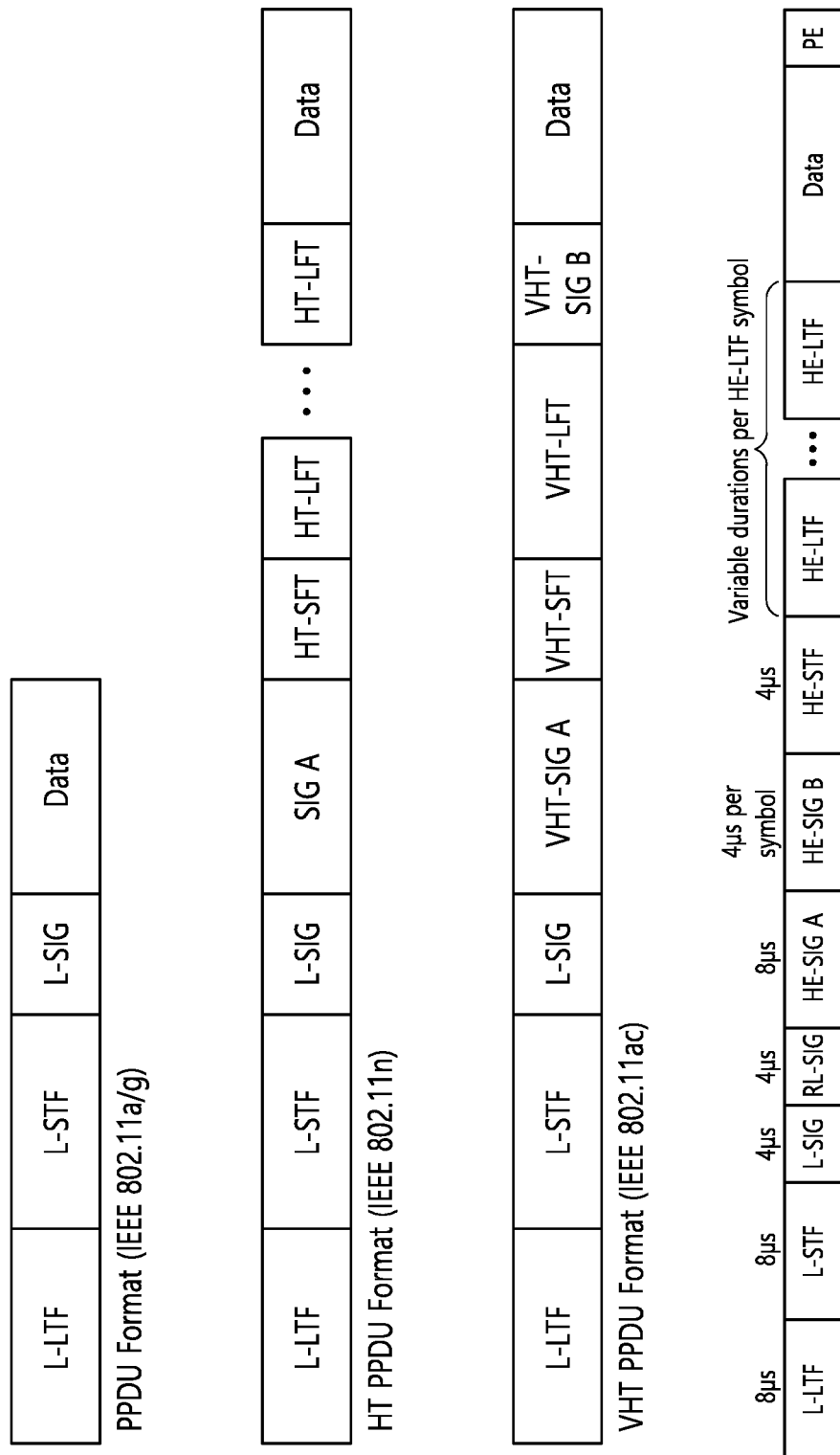
FIG. 4 illustrates an example of a PPDU used in an IEEE standard.

FIG. 4 illustrates an example of a PPDU used in an IEEE standard.

As illustrated in FIG. 4, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
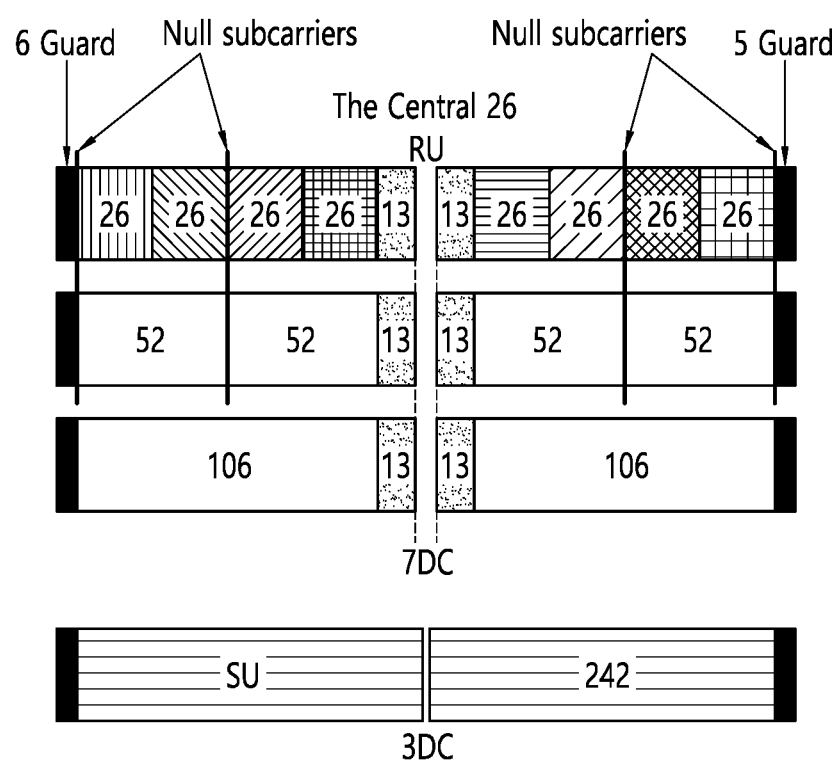
FIG. 5 is a diagram illustrating a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
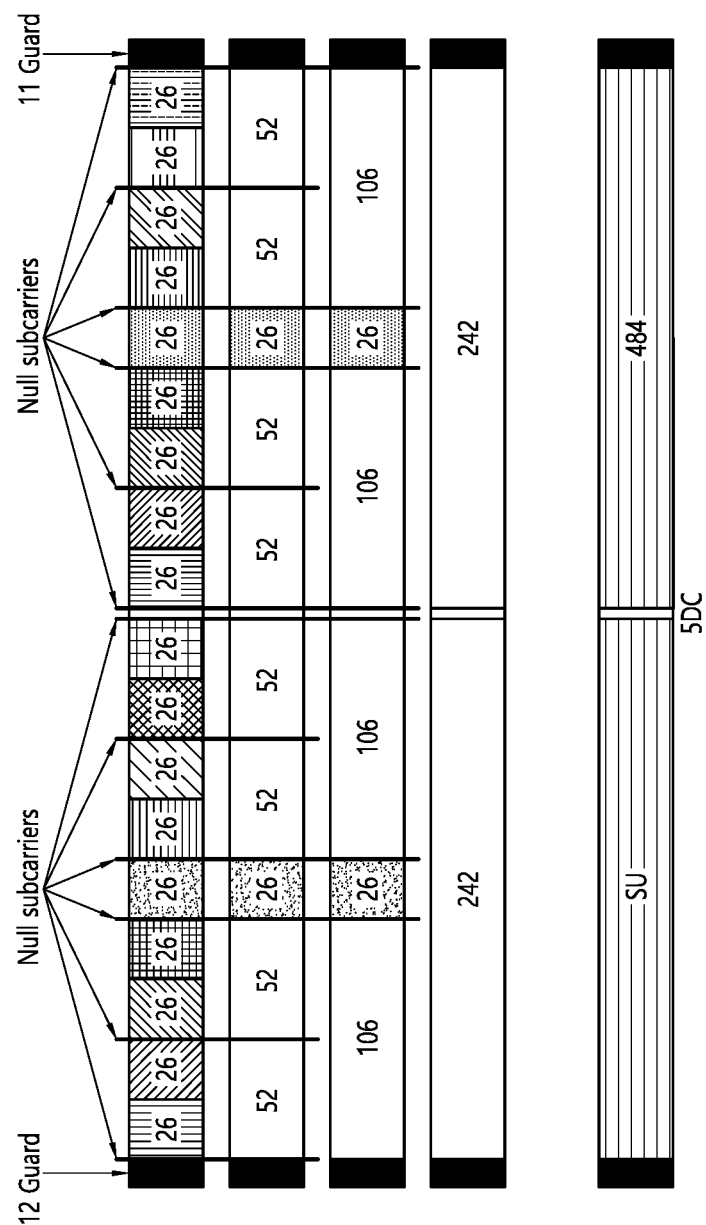
FIG. 6 is a diagram illustrating a layout of resource units (RUs) used in a band of 40 MHz

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
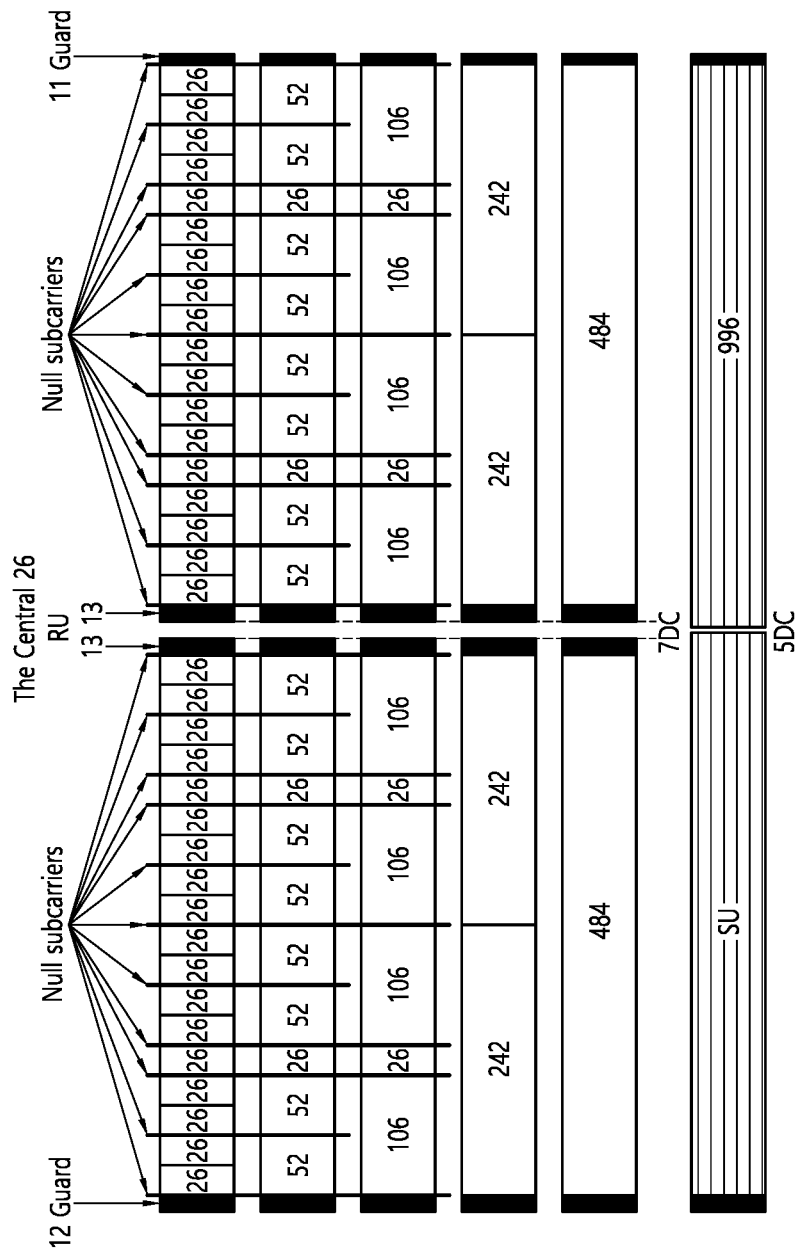
FIG. 7 is a diagram illustrating a layout of resource units (RUs) used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g. EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
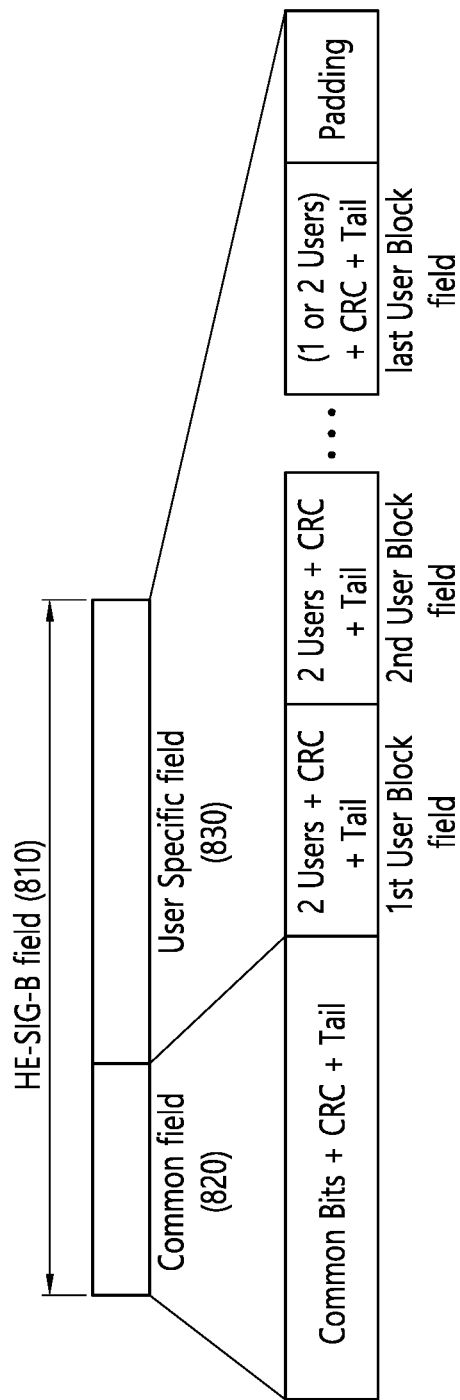
FIG. 8 illustrates the structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 20 | 26 | 26 | 26 | 26 | 52 | 26 | 26 | | 1 |
| 00000011 | 26 | 26 | 26 | 26 | 26 | 52 | 52 | | | 1 |
| 00000100 | 26 | 26 | 52 | 26 | 26 | 26 | 26 | 26 | | 1 |

TABLE 1-continued

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000101 | 26 | 26 | 52 | 26 | 26 | 26 | 52 | | | 1 |
| 00000110 | 26 | 26 | 52 | 26 | 52 | 26 | 26 | | | 1 |
| 00000111 | 26 | 26 | 52 | 26 | 52 | 52 | | | | 1 |
| 00001000 | 52 | 26 | 26 | 26 | 26 | 76 | 26 | 26 | | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information. For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | 106 | | 26 | 26 | 26 | 26 | 26 | | | 8 |
| 01001$y_2y_1y_0$ | 106 | | 26 | 26 | 26 | 52 | | | | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000$y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
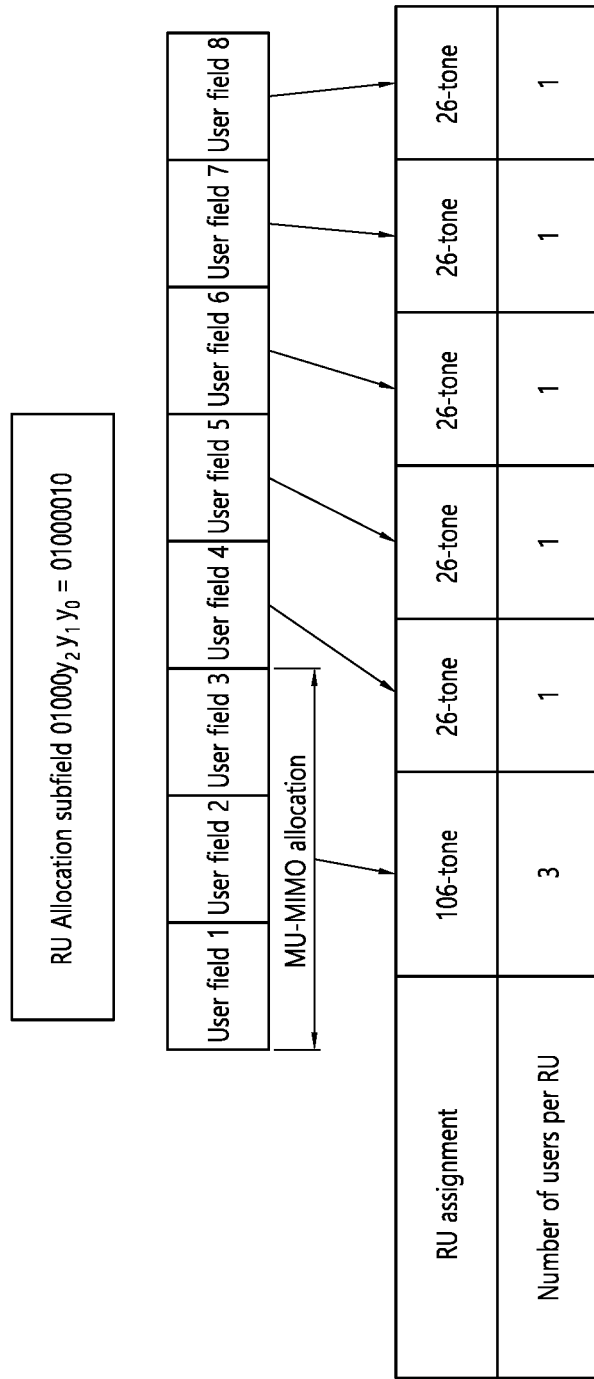
FIG. 9 illustrates an example in which a plurality of user STAs is allocated to the same RU through a MU-MIMO technique.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format.

The first format or the second format may include bit information of the same length (e.g., 21 bits).

Figure 10:
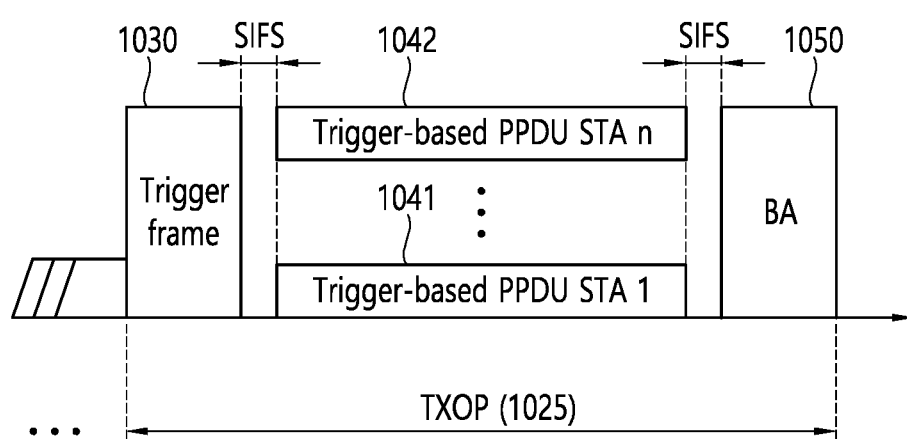
FIG. 10 illustrates a UL-MU operation.

FIG. 10 illustrates an operation based on UL-MU. As illustrated, a transmitting STA (e.g., AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
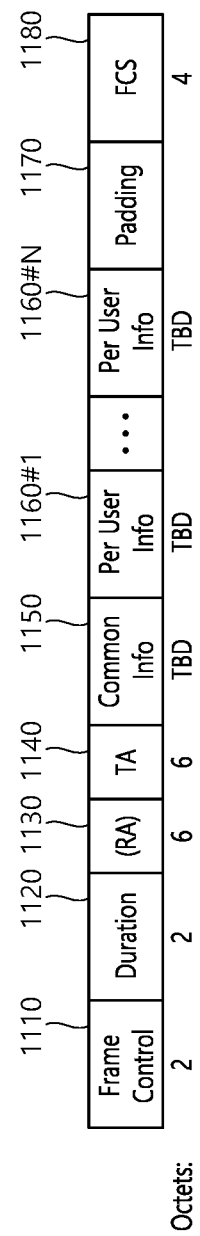
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of an STA.

In addition, an RA field 1130 may include address information of a receiving STA of a corresponding trigger frame, and may be optionally omitted. A TA field 1140 may include address information of an STA (e.g., AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
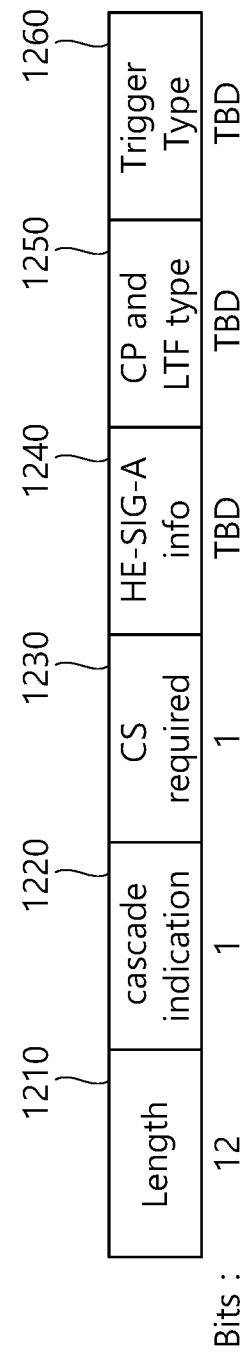
FIG. 12 illustrates an example of a common information field of the trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
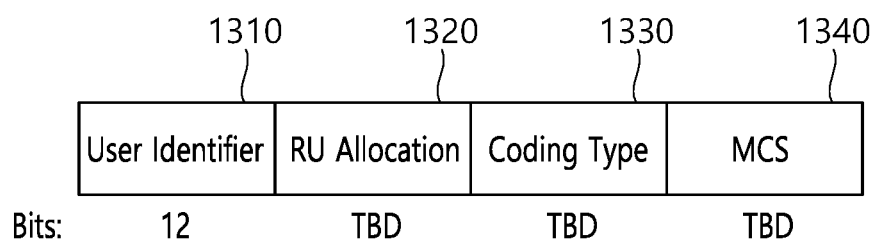
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of an STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
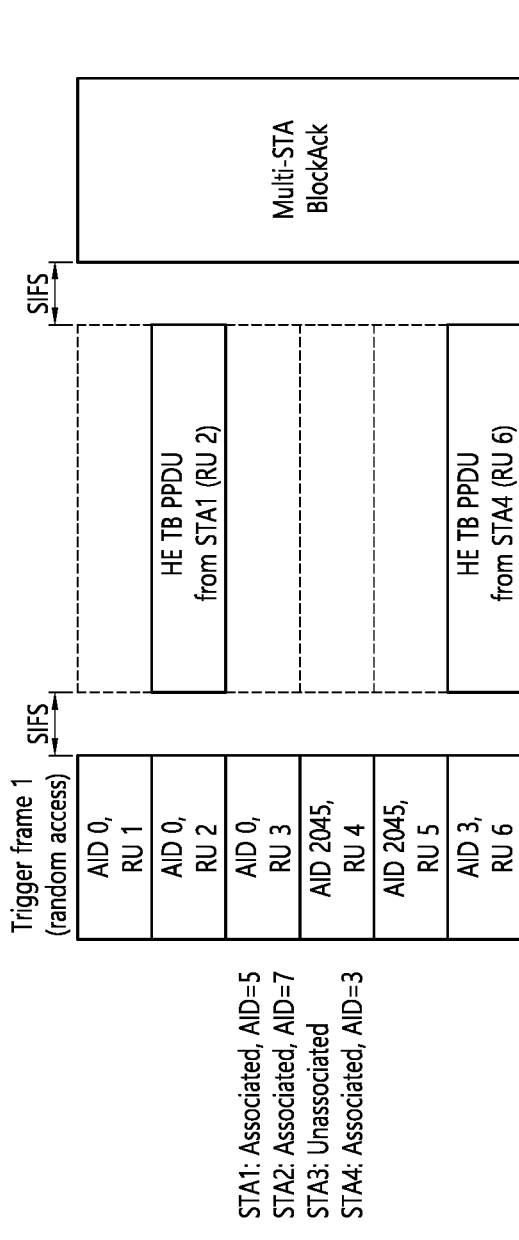
FIG. 14 illustrates technical characteristics of a UROA technique.

FIG. 14 describes a technical feature of the UORA scheme.

A transmitting STA (e.g., AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of an STA1 is decreased to 0, and the STA1 randomly selects the 2nd RU resource (AID 0, RU 2). In addition, since an OBO counter of an STA2/3 is greater than 0, an uplink resource is not allocated to the STA2/3. In addition, regarding an STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
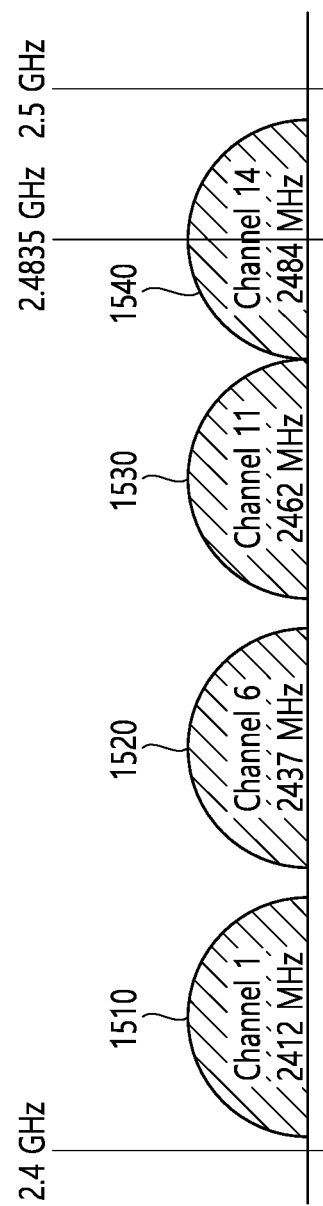
FIG. 15 illustrates an example of a channel used/supported/defined in a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
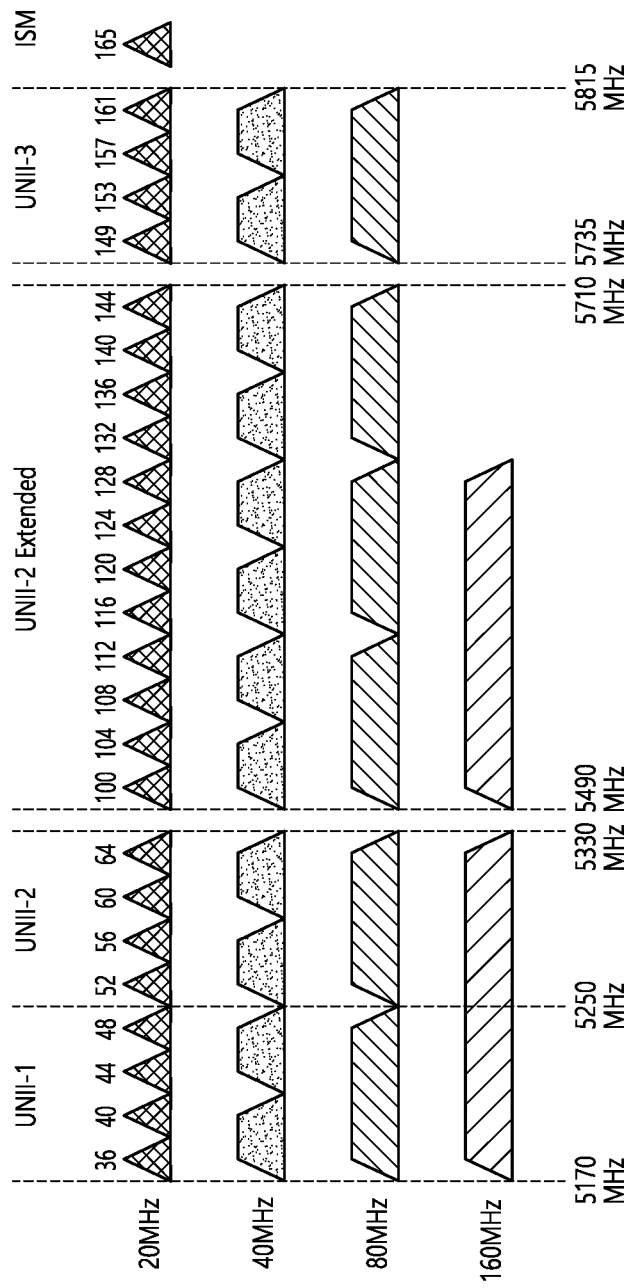
FIG. 16 illustrates an example of a channel used/supported/defined in a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
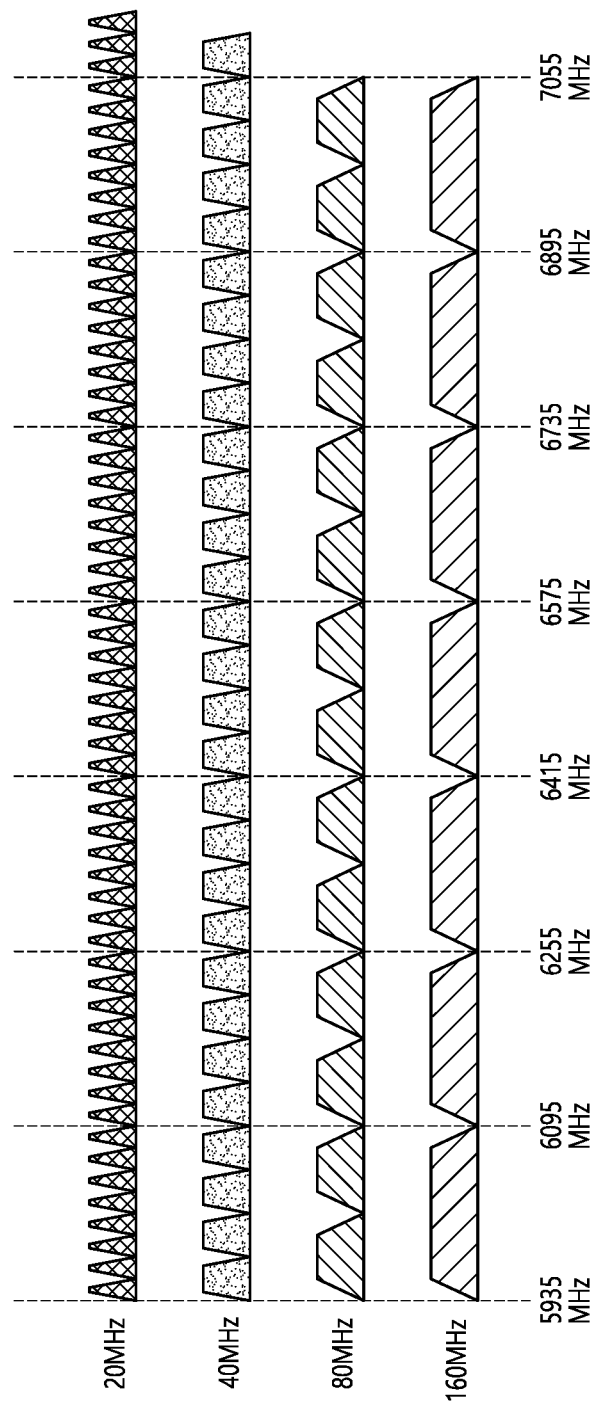
FIG. 17 illustrates an example of a channel used/supported/defined in a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N)GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in an STA of the present specification will be described.

Figure 18:
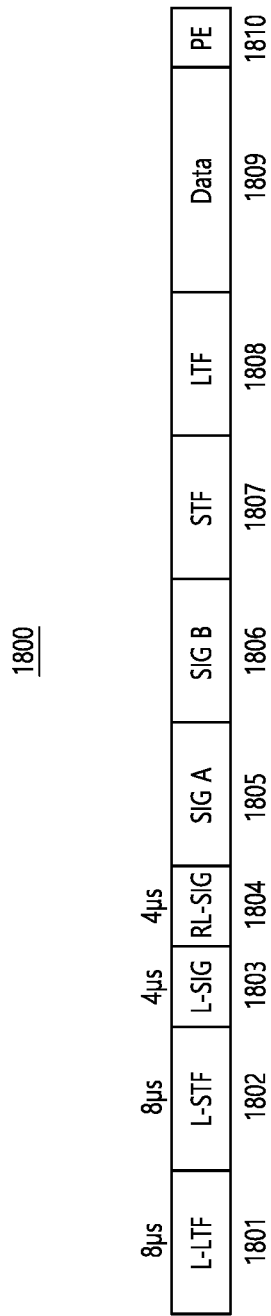
FIG. 18 illustrates an example of a PPDU used in the present disclosure.

FIG. 18 illustrates an example of a PPDU used in the present specification.

The PPDU depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields depicted in FIG. 18 may be referred to as various terms. For example, a SIG A field may be referred to an EHT-SIG-A field, a SIG B field may be referred to an EHT-SIG-B, a STF field may be referred to an EHT-STF field, and an LTF field may be referred to an EHT-LTF.

The subcarrier spacing of the L-LTF, L-STF, L-SIG, and RL-SIG fields of FIG. 18 can be set to 312.5 kHz, and the subcarrier spacing of the STF, LTF, and Data fields of FIG. 18 can be set to 78.125 kHz. That is, the subcarrier index of the L-LTF, L-STF, L-SIG, and RL-SIG fields can be expressed in unit of 312.5 kHz, and the subcarrier index of the STF, LTF, and Data fields can be expressed in unit of 78.125 kHz.

The SIG A and/or SIG B fields of FIG. 18 may include additional fields (e.g., a SIG C field or one control symbol, etc.). The subcarrier spacing of all or part of the SIG A and SIG B fields may be set to 312.5 kHz, and the subcarrier spacing of the remaining part/fields may be set to 78.125 kHz.

In the PPDU of FIG. 18, the L-LTF and the L-STF may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG which is identical to the L-SIG. BPSK modulation may be applied to the RL-SIG. The receiving STA may figure out that the RX PPDU is the HE PPDU or the EHT PPDU, based on the presence of the RL-SIG.

After the RL-SIG of FIG. 18, for example, EHT-SIG-A or one control symbol may be inserted. A symbol contiguous to the RL-SIG (i.e., EHT-SIG-A or one control symbol) may include 26-bit information and may further include information for identifying the type of the EHT PPDU. For example, when the EHT PPDU is classified into various types (e.g., an EHT PPDU supporting an SU mode, an EHT PPDU supporting a MU mode, an EHT PPDU related to the Trigger Frame, an EHT PPDU related to an Extended Range transmission, etc.), Information related to the type of the EHT PPDU may be included in a symbol contiguous to the RL-SIG.

A symbol contiguous to the RL-SIG may include, for example, information related to the length of the TXOP and information related to the BSS color ID. For example, the SIG-A field may be contiguous to the symbol contiguous to the RL-SIG (e.g., one control symbol). Alternatively, a symbol contiguous to the RL-SIG may be the SIG-A field.

For example, the SIG-A field may include 1) a DL/UL indicator, 2) a BSS color field which is an identifier of a BSS, 3) a field including information related to the remaining time of a current TXOP section, 4) a bandwidth field including information related to the bandwidth, 5) a field including information related to an MCS scheme applied to an HE-SIG B, 6) a field including information related to whether a dual subcarrier modulation (DCM) scheme is applied to the HE-SIG B, 7) a field including information related to the number of symbols used for the HE-SIG B, 8) a field including information related to whether the HE-SIG B is generated over the entire band, 9) a field including information related to the type of the LTF/STF, 10) a field indicating the length of the HE-LTF and a CP length.

An STF of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 µs, and a periodicity signal of 0.8 µs may be repeated 5 times to become a first type STF having a length of 4 µs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 µs, and a periodicity signal of 1.6 µs may be repeated 5 times to become a second type STF having a length of 8 µs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 µs, and a periodicity signal of 3.2 µs may be repeated 5 times to become a second type STF having a length of 16 µs. Only some of the first to third type EHT-STF sequences may be used. In addition, the EHT-LTF field may also have first, second, and third types (i.e., 1×, 2×, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 µs. In addition, Guard Intervals (GIs) with various lengths (e.g., 0.8/1/6/3.2 µs) may be applied to the first/second/third type LTF.

Information related to the type of STF and/or LTF (including information related to GI applied to the LTF) may be included in the SIG A field and/or the SIG B field of FIG. 18.

The PPDU of FIG. 18 may be identified as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; and 3) L-SIG including a length field in which a result of applying "modulo 3" is set to "0".

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, there may be cases where: 1) a first symbol after an L-LTF signal is a BPSK symbol; 2) RL-SIG in which L-SIG is repeated is not detected; and 3) the receiving STA determines that it is not 802.11ax and thus operates as a state machine for determining the legacy STA, and determines constellation of two symbols received after the L-SIG. In these cases, the RX PPDU may be determined as the non-HT, HT, and VHT PPDU.

The STA (AP and/or non-AP STA) of the present disclosure may support multilink communication. The STA supporting multilink communication may simultaneously perform communication through multiple links. That is, the STA supporting multilink communication may perform communication through multiple links during a first time period and may perform communication through only one of the multiple links during a second time period.

Multilink communication may mean communication supporting a plurality of links, and one link can include a channel (for example, 20/40/80/160/240/320 MHz channels) defined in a 2.4 GHz band, a 5 GHz band, a 6 GHz band, and/or a specific band described below. Hereinafter, the concept of conventional channel bonding will be described.

For example, in the IEEE 802.11n system, 40 MHz channel bonding may be performed by combining two 20 MHz channels. In addition, 40/80/160 MHz channel bonding may be performed in the IEEE 802.11ac system.

For example, a STA may perform a channel bonding for a primary 20 MHz channel (P20 channel) and a secondary 20 MHz channel (S20 channel). In the channel bonding process, a backoff count/counter may be used. The backoff count value is selected to be a random value and may be decreased during a backoff interval. In general, when the backoff count value becomes 0, the STA is able to attempt to access the channel.

When the P20 channel is determined to be in the idle state during the backoff interval and the backoff count value for the P20 channel becomes 0, a STA performing the channel bonding determines whether the S20 channel has been maintained to be idle for a certain period (e.g., point coordination function (PIFS)). If the S20 channel is in the idle state, the STA may perform a channel bonding for the P20 channel and the S20 channel. That is, the STA may transmit a signal (PPDU) through a 40 MHz channel (i.e., a 40 MHz bonding channel) including the P20 channel and the S20 channel.

Hereinafter, the HARQ technique applied to an example of the present specification will be described.

The HARQ technique is a technique combining a forward error correction (FEC) scheme and an automatic repeat request (ARQ) scheme. According to the HARQ method, the physical layer checks whether the received data contains an error that cannot be decoded, and if an error occurs, the performance is improved by requesting retransmission.

The HARQ receiver basically attempts error correction on received data and determines whether to retransmit using an error detection code. The error detection code may be various codes. For example, in case of using a cyclic redundancy check (CRC), when an error of the received data is detected through a CRC detection process, the receiver may transmit a non-acknowledgement (NACK) signal to the transmitter. Upon receiving the NACK signal, the transmitter may transmit appropriate retransmission data according to the HARQ mode. The receiver receiving the retransmission data may improve reception performance by combining the previous data and the retransmission data for decoding.

The mode of HARQ can be classified into chase combining and incremental redundancy (IR). The chase combining is a method of obtaining a signal-to-noise ratio (SNR) gain by combining data with error-detected data with retransmitted data without discarding it. The IR is a method in which additional redundant information is incrementally transmitted in retransmitted data to obtain a coding gain.

Figure 19:
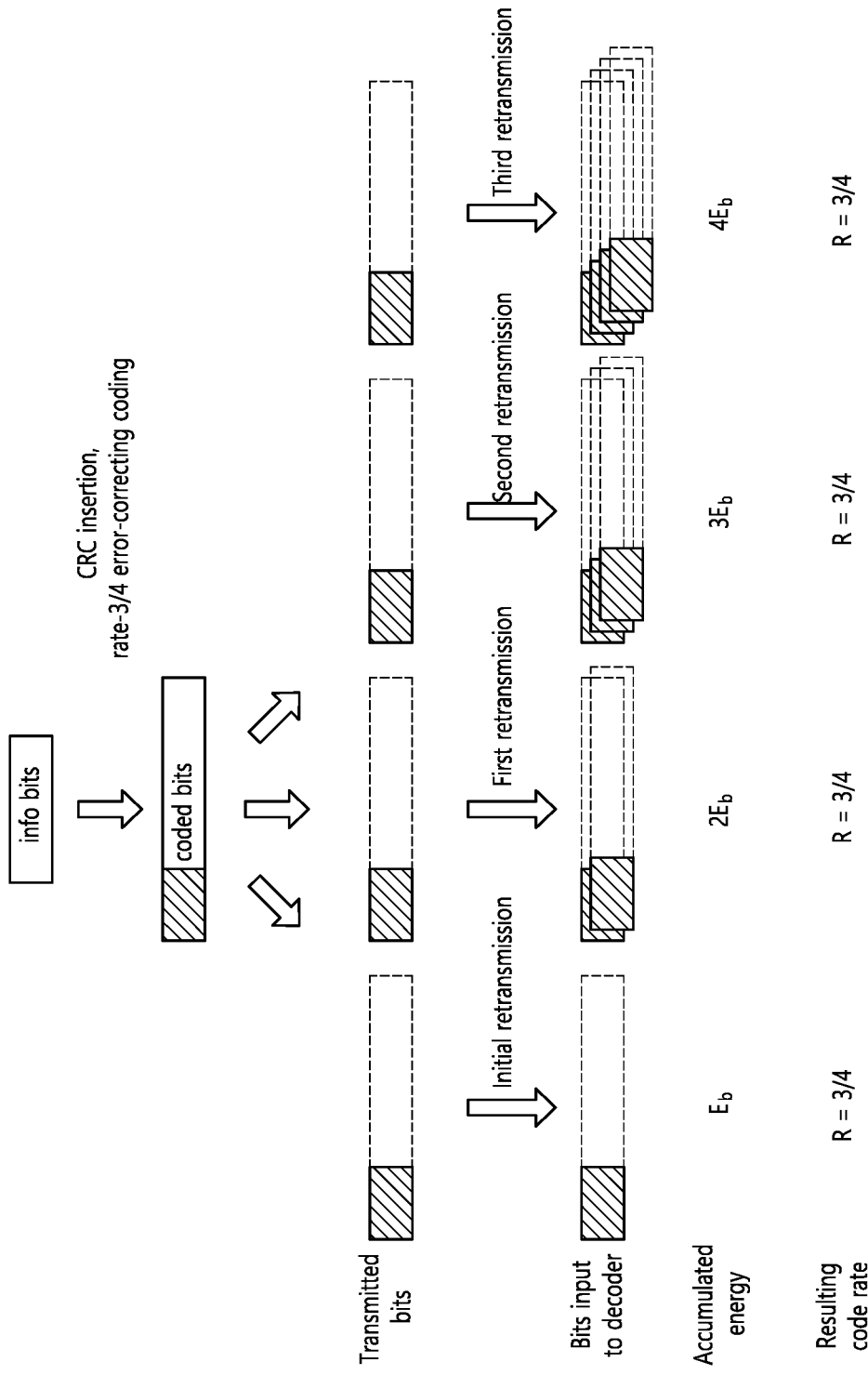
FIG. 19 is a diagram illustrating an example of chase combining.

FIG. 19 is a diagram illustrating an example of chase combining. The chase combining is a method in which the same coded bit as in the initial transmission is retransmitted.

Figure 20:
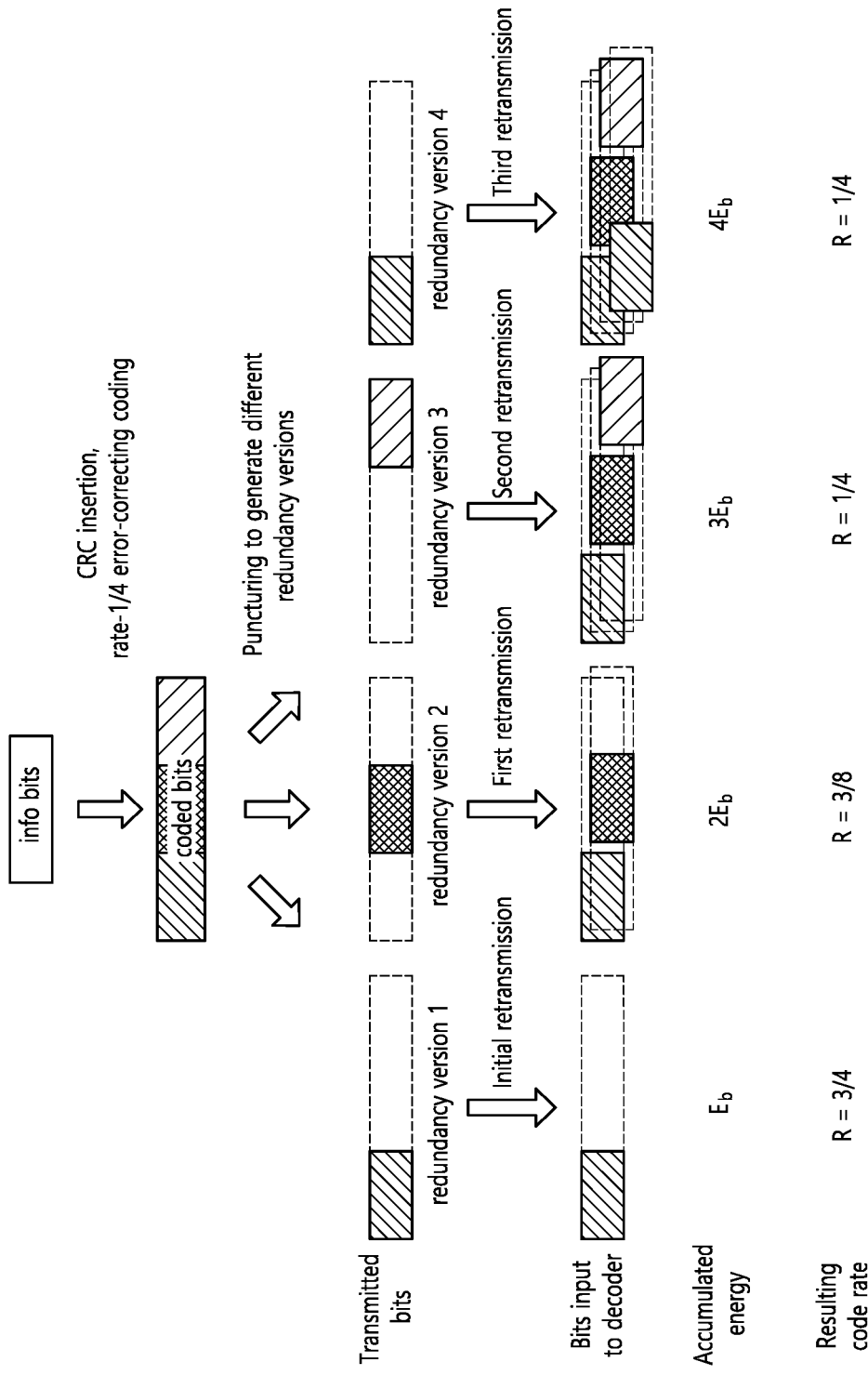
FIG. 20 is a diagram illustrating an example of an incremental redundancy (IR) method.

FIG. 20 is a diagram illustrating an example of an incremental redundancy (IR) method. In the IR method, the coded bits that are initially transmitted and subsequently retransmitted may be different as follows. Accordingly, when the IR method is used, the STA performing retransmission generally delivers an IR version (or packet version/retransmission version) to the receiving STA. In the following drawings, the transmitting STA performs retransmission in the order of IR version-1, IR Version-2, IR Version-3, and IR Version-1. The receiving STA may combine the received packet/signal for decoding.

The HARQ may have the effect of expanding coverage in a low SNR environment (e.g., an environment in which a transmitter and a receiver are far apart). The HARQ may have the effect of increasing throughput in a high SNR environment.

According to the basic procedure of HARQ, a transmitter can transmit packets and a receiver can receive the packets. The receiver may check whether received packets contain errors. The receiver may feedback a request to the transmitter to retransmit erroneous packets among the received packets. For example, the receiver may transmit a request for retransmission of the erroneous packets among packets received through the ACK/NACK frame or the Block ACK frame. The transmitter may receive feedback from the receiver and may retransmit data for erroneous packets based on the feedback. For example, the transmitter may transmit packets for the erroneous packets along with new packets. Packets that have not generated errors may not be retransmitted. The receiver may perform decoding by combining previously received erroneous packets and retransmitted packets. A method of combining packets may be classified into a first method of combining in modulation symbol units (e.g., BPSK, QPSK, 16QAM, 64QAM, 256QAM, 1024QAM, etc.) and a second method of combining in units of log-likelihood ratio (LLR) values after de-mapper. Hereinafter, technical features will be described based on a method of combining in LLR value units. If decoding is performed by combining the previously received packet with the retransmitted packet, but an error occurs, the above procedure can be repeated as many times as the preset maximum number of retransmissions.

Figure 21:
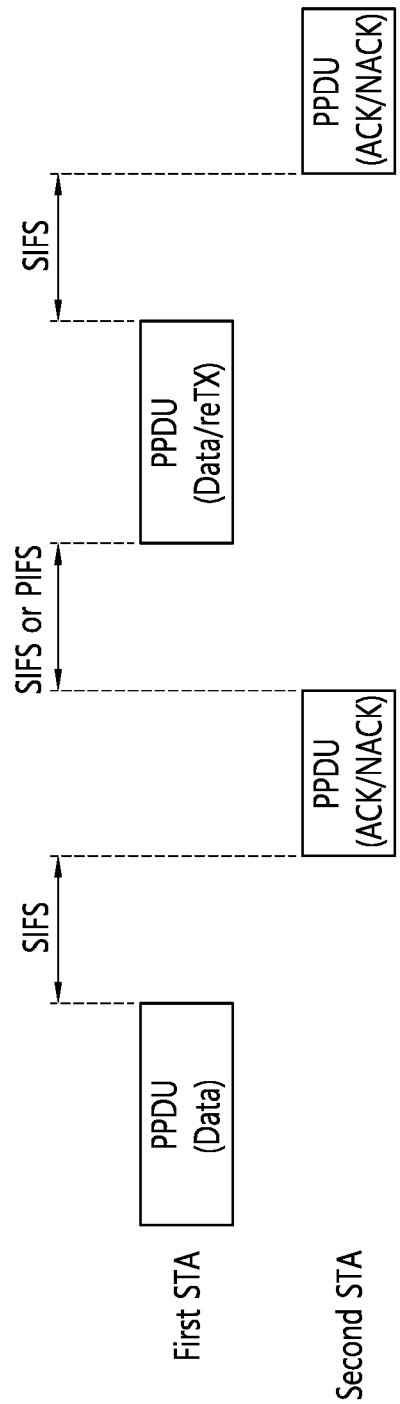
FIG. 21 is a diagram illustrating an embodiment of an HARQ operation in a wireless LAN system.

FIG. 21 is a diagram illustrating an embodiment of an HARQ operation in a wireless LAN system.

The horizontal axis of FIG. 21 may represent the time axis. The first STA 110 (or 120) may transmit a PPDU to the second STA 120 (or 110). For example, the first STA 110 (or 120) may transmit a PPDU including first data to the second STA 120 (or 110), and the second STA 120 (or 110) may receive a PPDU including the first data from the first STA 110 (or 120).

The second STA 120 (or 110) may receive a PPDU from the first STA 110 (or 120). The second STA 120 (or 110) may perform decoding of the received PPDU. The second STA 120 (or 110) may check an error of the received PPDU. For example, the second STA 120 (or 110) may check an error in the first data included in the PPDU by using a frame check sequence (FCS) or a cyclic redundancy check (CRC).

If there is an error, the second STA 120 (or 110) may transmit a NACK. For example, when there is an error in the first data of the received PPDU, the second STA 120 (or 110) may transmit the NACK for the first data to the first STA 110

(or 120) after short inter-frame space (SIFS). The first STA 110 (or 120) may receive the NACK from the second STA 120 (or 110). Upon receiving the NACK, the first STA 110 (or 120) may retransmit the first data in which an error occurred in the second STA 120 (or 110) to the second STA 120 (or 110). For example, the first STA 110 (or 120) may receive the NACK and retransmit the PPDU including the first data after the SIFS or a point coordination function (PIFS). Alternatively, for example, the first STA 110 (or 120) may receive the NACK and perform contention to retransmit the PPDU including the first data to the second STA 120 (or 110). For example, the PPDU retransmitted by the first STA 110 (or 120) may include the erroneous first data and new second data.

The second STA 120 (or 110) may receive the retransmitted PPDU from the first STA 110 (or 120). The second STA 120 (or 110) may decode the first data and perform error checking. Based on the results of the decoding and the error checking, the second STA 120 (or 110) may transmit an ACK or a NACK to the first STA 110 (or 120). For example, the retransmission may be repeated as many times as a preset maximum allowable number of transmissions.

In the incremental redundancy (IR) technique, different parity bits or different sets of parity bits (e.g., information bits and parity bits) may be transmitted for each retransmission. Information including information bits and parity bits may be defined as a redundancy version. There may be multiple redundancy versions (RVs) with different parity bits for the same data.

Upon retransmission, the transmitting STA 110 (or 120) may transmit a redundancy version different from the redundancy version transmitted during the initial transmission. The receiving STA 120 (or 110) may perform decoding by combining the previously received redundancy version with the newly received redundancy version. The receiving STA 120 (or 110) may transmit an ACK if the decoding is successful, and may request retransmission by transmitting a NACK if there is an error. Upon receiving the NACK, the transmitting STA 110 (or 120) may retransmit based on another redundancy version.

An example of the present specification described below relates to a technical feature of performing the HARQ operation of the STAs 110 and 120 supporting hybrid automatic repeat request-incremental redundancy (HARQ-IR).

The STA 110 (or 120) may perform a binary convolutional code (BCC) encoding on the data field. The STA 110 (or 120) may puncture the BCC-encoded data field. For example, the STA 110 (or 120) may puncture the BCC encoded data field according to a code rate (e.g., 2/3, 3/4, 5/6, etc.). There may be several types of patterns for puncturing the encoded data field. For example, there may be several types of puncturing patterns that satisfy the 2/3 code rate. The STA 110 (or 120) may transmit a PPDU including the punctured data field. For example, the PPDU may include a first data field punctured in a first pattern to satisfy a first code rate (e.g., 2/3, 3/4, or 5/6) and control information related to the first pattern. For example, the control information related to the first pattern may be included in the control field of the PPDU.

Figure 22:
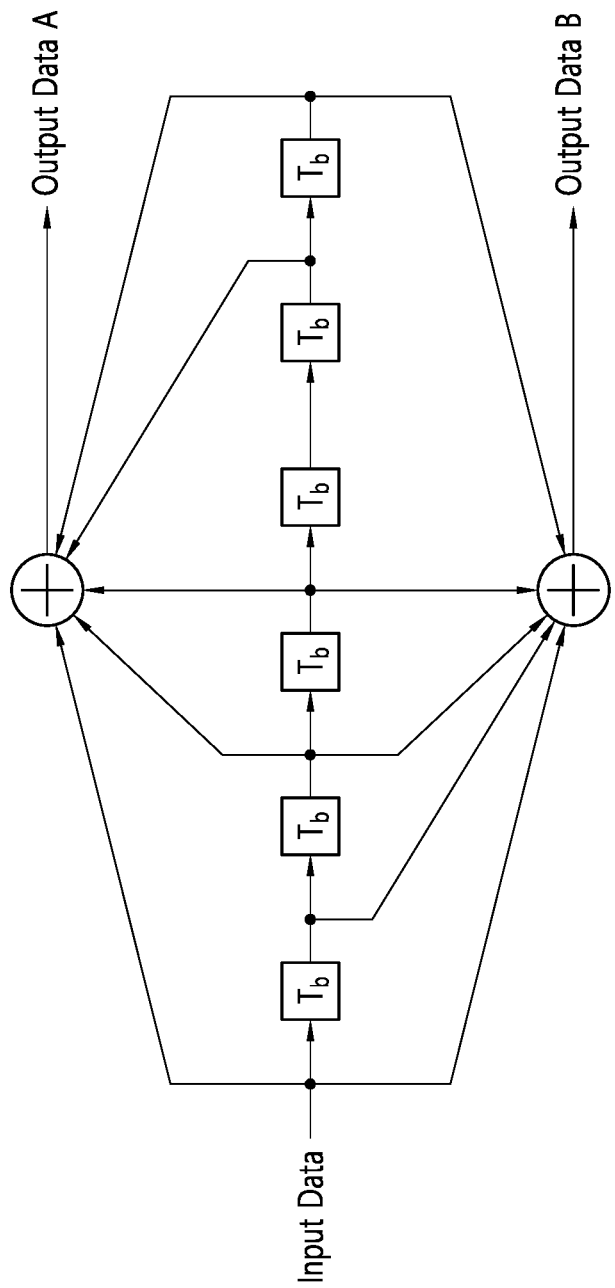
FIG. 22 is a diagram illustrating an example of a binary convolutional code (BCC) encoder.

FIG. 22 is a diagram illustrating an example of a binary convolutional code (BCC) encoder.

The BCC encoder of FIG. 22 is an encoder having a 1/2 code rate in which a constraint field is set to 7 (i.e., k=7). When one bit of input data is input, two bits are generated as output data. For example, when input data is input as shown in FIG. 22, output data A and output data B may be generated as output data. Since two output data (e.g., parity bits) are calculated for each input data, the code rate is set to 1/2.

Since the code rate of the BCC encoder is 1/2, when the code rate of 1/2 is used, encoded data can be transmitted without performing puncturing. When a code rate other than 1/2 (e.g., 2/3, 3/4, 5/6, etc.) is used, the code rate may be adjusted through puncturing. Hereinafter, a method of adjusting the code rate of BCC encoding through puncturing is described.

Figure 23:
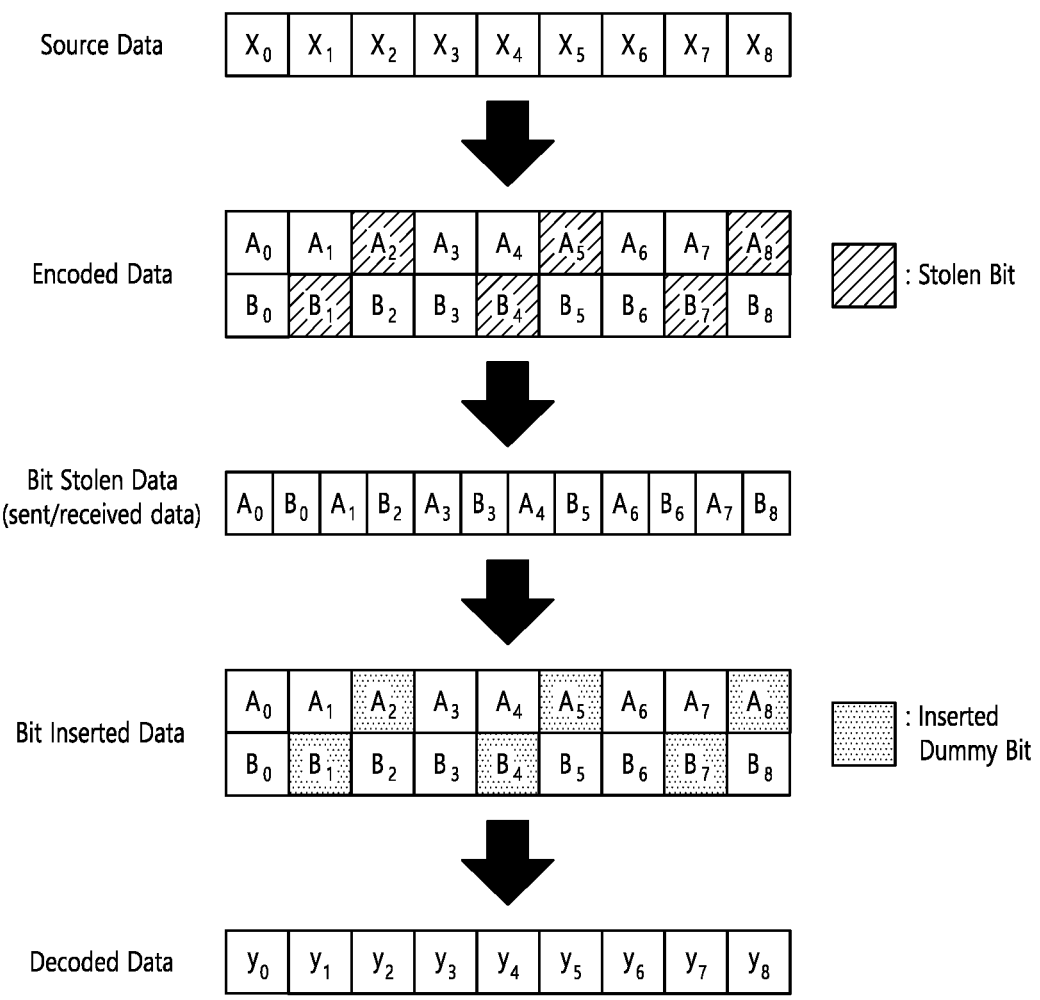
FIG. 23 is a diagram illustrating an example of a puncturing method for a 3/4 code rate.

FIG. 23 is a diagram illustrating an example of a puncturing method for a 3/4 code rate.

Referring to FIG. 23, source data may be $X_0$, $X_1$, $X_2$, $X_3$, $X_4$, $X_5$, $X_6$, $X_7$, and $X_8$. When the source data $X_0$, $X_1$, $X_2$, $X_3$, $X_4$, $X_5$, $X_6$, $X_7$, and $X_8$ are BCC encoded, $A_0$, $A_1$, $A_2$, $A_3$, $A_4$, $A_5$, $A_6$, $A_7$, $A_8$, $B_0$, $B_1$, $B_2$, $B_3$, $B_4$, $B_5$, $B_6$, $B_7$, and $B_8$ may be generated as output. That is, when $X_n$ is encoded, $A_n$ and $B_n$ (n may be a natural number or 0) may be generated as output. $B_1$, $A_2$, $B_4$, $A_5$, $B_7$, and $A_8$ shaded in FIG. 23 may be punctured bits. The receiving STA 110 (or 120) may also figure out which bits of the encoded data are punctured. For example, the receiving STA 110 (or 120) may know which bits (e.g., $B_1$, $A_2$, $B_4$, $A_5$, $B_7$, and $A_8$) are punctured through a pre-determined rule negotiated with the transmitting STA 110 (or 120).

The transmitting STA 110 (or 120) may transmit punctured data (or bit-stolen data) to the receiving STA 120 (or 110). The order of transmitted data may be $A_0$, $B_0$, $A_1$, $B_2$, $A_3$, $B_3$, $A_4$, $B_5$, $A_6$, $B_6$, $A_7$, and $B_8$. The receiving STA 120 (or 110) may receive the punctured data. The receiving STA 120 (or 110) may set the LLR values for the punctured bits (e.g., $B_1$, $A_2$, $B_4$, $A_5$, $B_7$, and $A_8$) to a default value or a '0' value. The receiving STA 120 (or 110) may perform decoding after setting values for the punctured bits.

The puncturing pattern may have a structure in which 6 parity bits (having a 2-by-3 matrix structure) are repeated. If the repeated structure is expressed as a matrix, a corresponding matrix may be represented as Equation 1 as shown below.

$$\begin{bmatrix} 1 & 1 & 0 \\ 1 & 0 & 1 \end{bmatrix} \quad \text{[Equation 1]}$$

Referring to Equation 1, elements in the first row of the matrix may correspond to $A_0$, $A_1$, and $A_2$, respectively, and elements in the second row of the matrix may correspond to $B_0$, $B_1$, and $B_2$, respectively. An element having a value '1' may mean a bit transmitted without being punctured. For example, '1' may mean a bit that is not punctured but is bypassed and transmitted. An element having a value '0' may mean a bit that is punctured and not transmitted. For example, in FIG. 23, $A_0$, $B_0$, $A_1$, and $B_2$ located at the '1' positions among the left 6 bits ($A_0$, $B_0$, $A_1$, $B_1$, $A_2$, $B_2$) of the encoded data are transmitted without puncturing. Further, $B_1$ and $A_2$ located at the '0' positions may be punctured bits that are not transmitted.

Figure 24:
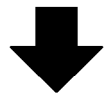
FIG. 24 is a diagram illustrating an example of a puncturing method for a 2/3 code rate.

FIG. 24 is a diagram illustrating an example of a puncturing method for a 2/3 code rate.

Referring to FIG. 24, source data may be $X_0$, $X_1$, $X_2$, $X_3$, $X_4$, and $X_5$. When the source data $X_0$, $X_1$, $X_2$, $X_3$, $X_4$, and $X_5$ are BCC encoded, $A_0$, $A_1$, $A_2$, $A_3$, $A_4$, $A_5$, $B_0$, $B_1$, $B_2$, $B_3$, $B_4$, and $B_5$ may be generated as output. That is, when $X_n$ is encoded, $A_n$ and $B_n$ (n may be a natural number or 0) may be generated as output. $B_1$, $B_3$, and $B_5$ shaded in FIG. 24 may be punctured bits. The receiving STA 120 (or 110) may also figure out which bits of the encoded data are punctured. For example, the receiving STA 120 (or 110) may know which bits (e.g., $B_1$, $B_3$, and $B_5$) are punctured a pre-determined rule negotiated with the transmitting STA 110 (or 120).

The transmitting STA 110 (or 120) may transmit punctured data (or bit-stolen data) to the receiving STA 120 (or 110). The order of transmitted data may be A0, B0, A1, A2, B2, A3, A4, B4, and A5. The receiving STA 120 (or 110) may receive the punctured data. The receiving STA 120 (or 110) may set LLR values for the punctured bits (e.g., B1, B3, and B5) to a default value or a '0' value. The receiving STA 120 (or 110) may perform decoding after setting values for the punctured bits.

The puncturing pattern may have a structure in which 4 parity bits (having a 2-by-2 matrix structure) are repeated. If the repeated structure is expressed as a matrix, a corresponding matrix may be represented as Equation 2 as shown below.

$$\begin{bmatrix} 1 & 1 \\ 1 & 0 \end{bmatrix} \quad \text{[Equation 2]}$$

Referring to Equation 2, elements in the first row of the matrix may correspond to $A_0$ and $A_1$, respectively, and elements in the second row of the matrix may correspond to $B_0$ and $B_1$, respectively. An element having a value '1' may mean a bit transmitted without being punctured. For example, '1' may mean a bit that is not punctured but is bypassed and transmitted. An element having a value '0' may mean a bit that is punctured and not transmitted. For example, in FIG. 24, $A_0$, $B_0$ and $A_1$ located at the '1' positions among the left 4 bits ($A_0$, $B_0$, $A_1$, $B_1$) of the encoded data are transmitted without puncturing. Further, $B_1$ located at the '0' positions may be a punctured bit that is not transmitted.

Figure 25:
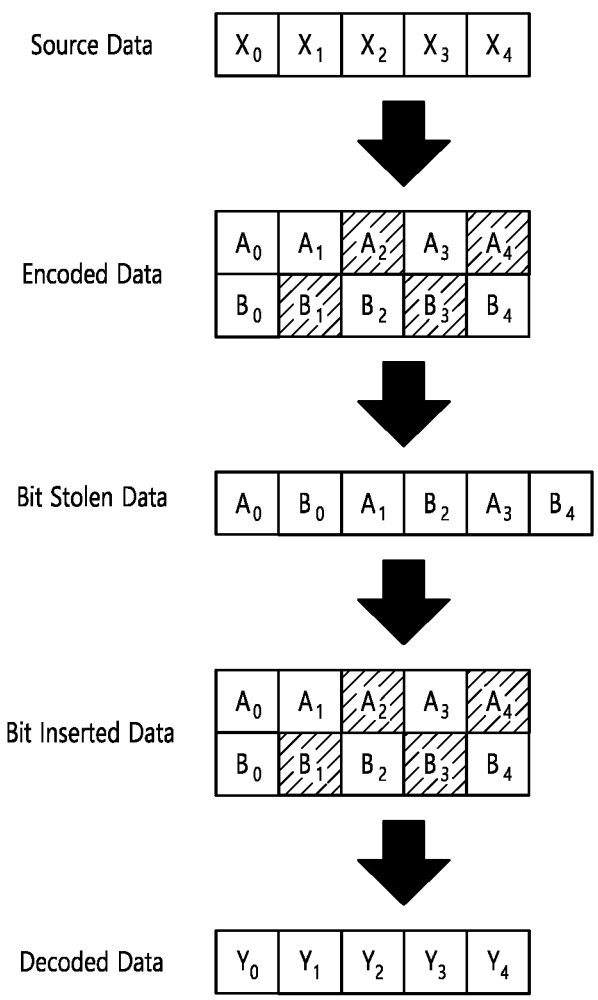
FIG. 25 is a diagram illustrating an example of a puncturing method for a 5/6 code rate.

FIG. 25 is a diagram illustrating an example of a puncturing method for a 5/6 code rate.

Referring to FIG. 25, source data may be $X_0$, $X_1$, $X_2$, $X_3$, and $X_4$. When the source data $X_0$, $X_1$, $X_2$, $X_3$, and $X_4$ are BCC encoded, $A_0$, $A_1$, $A_2$, $A_3$, $A_4$, $B_0$, $B_1$, $B_2$, $B_3$, and $B_4$ may be generated as output. That is, when $X_n$ is encoded, $A_n$ and $B_n$ (n may be a natural number or 0) may be generated as output. $B_1$, $A_2$, $B_3$, and $A_4$ shaded in FIG. 25 may be punctured bits. The receiving STA 120 (or 110) may also figure out which bits of the encoded data are punctured. For example, the receiving STA 120 (or 110) may know which bits (e.g., $B_1$, $A_2$, $B_3$, and $A_4$) are punctured through a pre-determined rule negotiated with the transmitting STA 110 (or 120).

The transmitting STA 110 (or 120) may transmit punctured data (or bit-stolen data) to the receiving STA 120 (or 110). The order of transmitted data may be $A_0$, $B_0$, $A_1$, $B_2$, $A_3$, and $B_4$. The receiving STA 120 (or 110) may receive the punctured data. The receiving STA 120 (or 110) may set the LLR values for the punctured bits (e.g., $B_1$, $B_3$, and $B_5$) to a default value or a '0' value. The receiving STA 120 (or 110) may perform decoding after setting values for the punctured bits.

The puncturing pattern may have a structure in which 10 parity bits (having a 2-by-5 matrix structure) are repeated. If the repeated structure is expressed as a matrix, a corresponding matrix may be represented as Equation 3 as shown below.

$$\begin{bmatrix} 1 & 1 & 0 & 1 & 0 \\ 1 & 0 & 1 & 0 & 1 \end{bmatrix} \quad \text{[Equation 3]}$$

Referring to Equation 3, elements in the first row of the matrix may correspond to $A_0$, $A_1$, $A_2$, $A_3$, and $A_4$, respectively, and elements in the second row of the matrix may correspond to $B_0$, $B_1$, $B_2$, $B_3$, and $B_4$, respectively. An element having a value '1' may mean a bit transmitted without being punctured. For example, '1' may mean a bit that is not punctured but is bypassed and transmitted. An element having a value '0' may mean a bit that is punctured and not transmitted. For example, $A_0$, $B_0$, $A_1$, $B_2$, $A_3$, and $B_4$ located at the '1' positions among the 10-bit ($A_0$, $B_0$, $A_1$, $B_1$, $A_2$, $B_2$, $A_3$, $B_3$, $A_4$, $B_4$) of encoded data in FIG. 25. are transmitted without puncturing. Further, $B_1$, $A_2$, $B_3$, and $A_4$ located at the '0' positions may be punctured bits that are not transmitted.

For transmission data, the puncturing may not be performed when a 1/2 code rate which is equal to the code rate of the BCC encoder (i.e., mother code rate) is used. When a code rate other than the 1/2 code rate (e.g., 2/3, 3/4, 5/6, etc.) is used, the puncturing may be performed. When the puncturing is performed, a puncturing pattern different from a previously used puncturing pattern may be used to create a redundancy version different from the redundancy version used in the previous transmission.

Hereinafter, a criterion applied when a new redundancy version is generated using a new puncturing pattern during data retransmission is proposed.

Two bits simultaneously calculated by the BCC encoder are not punctured at the same time. That is, at least one of $A_n$ and $B_n$ (n may be a natural number or 0) is not punctured. For example, $A_n$ and $B_m$ (n and m are not equal) may be punctured. For example, when a parity bit is expressed as a matrix as in Equations 1 to 3, at least one of the elements of a column vector constituting the matrix should be '1'. The reason for not puncturing two bits simultaneously calculated by the BCC encoder is that it is advantageous to transmit at least one of $A_n$ and $B_n$ being generated by one input data (or source data) $X_n$ and by the state of the same register in the STA 110 (or 120). For example, information on $X_n$ may be transmitted only when at least one of $A_n$ and $B_n$ is transmitted. If both $A_n$ and $B_n$ are punctured, a channel coding gain may be reduced because it is impossible to transmit/receive a result value for a specific state in the BCC encoder.

Upon retransmission, the previously punctured bit may not be punctured, and the bit furthest from the previously punctured bit (i.e., distant bit) may be punctured. For example, in the case of the third retransmission, bits that were not punctured in the initial transmission, the first retransmission, and the second retransmission may be punctured. The "distant bit" may indicate that the position/location of the bit to be punctured in the matrix (e.g., Equations 1 to 3) representing the puncturing pattern is the most distant from the position of the bit punctured in the previous transmission. The distance in the horizontal direction and the vertical direction is defined as '1' and the distance in the diagonal direction is defined as '2', and a circular structure is also considered as discussed below. For example, if the puncturing pattern of $$\begin{bmatrix} 1 & 1 \\ 1 & 0 \end{bmatrix}$$

is used in the initial transmission, the puncturing pattern of $$\begin{bmatrix} 0 & 1 \\ 1 & 1 \end{bmatrix}$$

may be used in the first retransmission. The puncturing patterns of $$\begin{bmatrix} 1 & 1 \\ 0 & 1 \end{bmatrix} \text{ and } \begin{bmatrix} 1 & 0 \\ 1 & 1 \end{bmatrix}$$

have a distance of '1' from the puncturing pattern used in the initial transmission. Since the puncturing pattern of $$\begin{bmatrix} 0 & 1 \\ 1 & 1 \end{bmatrix}$$

has a distance of '2' from the puncturing pattern used in the initial transmission, it can be used for the first retransmission. Considering the circular structure, for example, when the puncturing pattern is a structure in which six parity bits are repeated, the distance between 'a' and 'f' in the structure of $$\begin{bmatrix} a & b & c \\ d & e & f \end{bmatrix}$$

is not '3' in consideration of the circular structure such as $$\begin{bmatrix} a & b & c & a & b & c \\ d & e & f & d & e & f \end{bmatrix}.$$

This means that the distance is determined to be '2'. The previously punctured bit is not punctured, and the bit furthest from the previously punctured bit is punctured, thereby preventing burst puncturing of the parity bit calculated from the BCC encoder. Or, for example, by using the puncturing method, parity bits for as many states (in STAs 110 and 120) as possible can be transmitted, and channel coding gain can be improved.

When retransmission is performed multiple times, a puncturing pattern used for retransmission considers all previously used puncturing patterns. For example, the puncturing pattern used in the second retransmission may consider both the puncturing pattern used in the initial transmission and the puncturing pattern used in the first retransmission. For example, the bit punctured in the initial transmission and the bit punctured in the first retransmission may not be punctured in the second retransmission. Some of the bits transmitted in the previous transmission may be punctured. Bits that have been punctured in previous transmissions are not punctured as much as possible. If the bits to be punctured unavoidably overlap, the bit to be punctured can be determined in such a way that the greatest weight is given to the puncturing pattern applied to the transmission immediately before and a relatively low weight is given to the puncturing pattern applied to the transmission before that. For example, when determining the puncturing pattern to be applied to the third retransmission, if one of the bits that were punctured in the initial transmission, the first retransmission, and the second retransmission, respectively, should be punctured, the bit that was punctured in the initial transmission may be punctured. Even if the bits to be punctured overlap, the bit punctured in the previous retransmission and the bit punctured in this retransmission may be the most distant bit.

When determining a puncturing pattern for retransmission, if two or more puncturing patterns have the same distance as the previous puncturing pattern, a structure that can be expressed by circular shifting a previously used puncturing pattern is first used. For example, hardware complexity may be reduced if the previously used puncturing pattern is circularly shifted.

Tables 3 to 5 are examples of puncturing patterns to which the criteria described above are applied. The maximum number of transmissions is the sum of the initial transmission and retransmission times. For example, when the maximum number of transmissions is '4', three retransmissions including the initial transmission may be possible. Tables 3 to 5 are methods of using a preset puncturing pattern according to a transmission order.

TABLE 3

| Code Rate | Puncturing Pattern for Initial Transmission | Puncturing Pattern for Retransmission |
|---|---|---|
| 2/3 | $\begin{bmatrix} 1 & 1 \\ 1 & 0 \end{bmatrix}$ | $\begin{bmatrix} 0 & 1 \\ 1 & 1 \end{bmatrix}$ |
| 3/4 | $\begin{bmatrix} 1 & 1 & 0 \\ 1 & 0 & 1 \end{bmatrix}$ | $\begin{bmatrix} 1 & 0 & 1 \\ 0 & 1 & 1 \end{bmatrix}$ |
| 5/6 | $\begin{bmatrix} 1 & 1 & 0 & 1 & 0 \\ 1 & 0 & 1 & 0 & 1 \end{bmatrix}$ | $\begin{bmatrix} 1 & 0 & 1 & 0 & 1 \\ 0 & 1 & 0 & 1 & 1 \end{bmatrix}$ |

Table 3 is a table showing an embodiment of a puncturing pattern for each code rate when the maximum number of transmissions is '2'.

When the code rate is 2/3, the initial transmission puncturing pattern may be [1, 1; 1, 0]. In the present disclosure, a matrix [a, b; c, d] may represent a matrix having an element 'a' in the first row and the first column, an element 'b' in the first row and the second column, an element 'c' in the second row and the first column, and an element 'd' in the second row and the second column. That is, in the present disclosure, a comma can separate columns, and a semicolon can separate rows. When the code rate is 2/3, the retransmission puncturing pattern may be [0, 1; 1, 1].

When the code rate is 3/4, the initial transmit puncturing pattern may be [1, 1, 0; 1, 0, 1], and the retransmission puncturing pattern may be [1, 0, 1; 0, 1, 1].

When the code rate is 5/6, the initial transmit puncturing pattern may be [1, 1, 0, 1, 0; 1, 0, 1, 0, 1], and the retransmission puncturing pattern may be [1, 0, 1, 0, 1; 0, 1, 0, 1, 1].

TABLE 4

| Code rate | Puncturing Pattern for Initial Transmission | Puncturing Pattern for First Retransmission | Puncturing Pattern for Second Retransmission | Puncturing Pattern for Third Retransmission |
|---|---|---|---|---|
| 2/3 | $\begin{bmatrix} 1 & 1 \\ 1 & 0 \end{bmatrix}$ | $\begin{bmatrix} 0 & 1 \\ 1 & 1 \end{bmatrix}$ | $\begin{bmatrix} 1 & 0 \\ 1 & 1 \end{bmatrix}$ | $\begin{bmatrix} 1 & 1 \\ 0 & 1 \end{bmatrix}$ |
| 3/4 | $\begin{bmatrix} 1 & 1 & 0 \\ 1 & 0 & 1 \end{bmatrix}$ | $\begin{bmatrix} 1 & 0 & 1 \\ 0 & 1 & 1 \end{bmatrix}$ | $\begin{bmatrix} 0 & 1 & 1 \\ 1 & 1 & 0 \end{bmatrix}$ | $\begin{bmatrix} 1 & 1 & 0 \\ 0 & 1 & 1 \end{bmatrix}$ |
| 5/6 | $\begin{bmatrix} 1 & 1 & 0 & 1 & 0 \\ 1 & 0 & 1 & 0 & 1 \end{bmatrix}$ | $\begin{bmatrix} 1 & 0 & 1 & 0 & 1 \\ 0 & 1 & 0 & 1 & 1 \end{bmatrix}$ | $\begin{bmatrix} 0 & 1 & 0 & 1 & 1 \\ 1 & 0 & 1 & 1 & 0 \end{bmatrix}$ | $\begin{bmatrix} 1 & 0 & 1 & 1 & 0 \\ 0 & 1 & 1 & 0 & 1 \end{bmatrix}$ |

Table 4 shows an example of a puncturing pattern for each code rate when the maximum number of transmissions is 4.

When the code rate is 2/3, a puncturing pattern for the initial transmission is [1, 1; 1, 0], and a puncturing pattern for the first retransmission is [0, 1; 1, 1]. Further, a puncturing pattern for the second retransmission is [1, 0; 1, 1], and a puncturing pattern for the third retransmission is [1, 1; 0, 1].

When the code rate is 3/4, a puncturing pattern for the initial transmission is [1, 1, 0; 1, 0, 1], and a puncturing pattern for the first retransmission is [1, 0, 1; 0, 1, 1]. Further, a puncturing pattern for the second retransmission is [0, 1, 1; 1, 1, 0], and a puncturing pattern for the third retransmission is [1, 1, 0; 0, 1, 1].

When the code rate is 5/6, a puncturing pattern for the initial transmission is [1, 1, 0, 1, 0; 1, 0, 1, 0, 1], and a puncturing pattern for the first retransmission is [1, 0, 1, 0, 1; 0, 1, 0, 1, 1]. Further, a puncturing pattern for the second retransmission is [0, 1, 0, 1, 1; 1, 0, 1, 1, 0], and a puncturing pattern for the third retransmission is [1, 0, 1, 1, 0; 0, 1, 1, 0, 1].

Table 5 shows an example of a puncturing pattern for each code rate when the maximum number of transmissions is 8.

When the code rate is 2/3, a puncturing pattern for the initial transmission is [1, 1; 1, 0], and a puncturing pattern for the first retransmission is [0, 1; 1, 1]. Further, a puncturing pattern for the second retransmission is [1, 0; 1, 1], and a puncturing pattern for the third retransmission is [1, 1; 0, 1]. A puncturing pattern for the fourth retransmission is [1, 1; 1, 0], and a puncturing pattern for the fifth retransmission is [0, 1; 1, 1]. A puncturing pattern for the sixth retransmission is [1, 0; 1, 1], and a puncturing pattern for the seventh retransmission is [1, 1; 0, 1].

When the code rate is 3/4, a puncturing pattern for the initial transmission is [1, 1, 0; 1, 0, 1], and a puncturing pattern for the first retransmission is [1, 0, 1; 0, 1, 1]. Further, a puncturing pattern for the second retransmission is [0, 1, 1; 1, 1, 0], a puncturing pattern for the third retransmission is [1, 1, 0; 0, 1, 1]. A puncturing pattern for the fourth retransmission is [1, 0, 1; 1, 1, 0], and a puncturing pattern for the fifth retransmission is [0, 1, 1; 1, 0, 1]. A puncturing

TABLE 5

| Code rate | Puncturing Pattern for Initial Transmission | Puncturing Pattern for First Retransmission | Puncturing Pattern for Second Retransmission | Puncturing Pattern for Third Retransmission |
|---|---|---|---|---|
| 2/3 | $\begin{bmatrix} 1 & 1 \\ 1 & 0 \end{bmatrix}$ | $\begin{bmatrix} 0 & 1 \\ 1 & 1 \end{bmatrix}$ | $\begin{bmatrix} 1 & 0 \\ 1 & 1 \end{bmatrix}$ | $\begin{bmatrix} 1 & 1 \\ 0 & 1 \end{bmatrix}$ |
| 3/4 | $\begin{bmatrix} 1 & 1 & 0 \\ 1 & 0 & 1 \end{bmatrix}$ | $\begin{bmatrix} 1 & 0 & 1 \\ 0 & 1 & 1 \end{bmatrix}$ | $\begin{bmatrix} 0 & 1 & 1 \\ 1 & 1 & 0 \end{bmatrix}$ | $\begin{bmatrix} 1 & 1 & 0 \\ 0 & 1 & 1 \end{bmatrix}$ |
| 5/6 | $\begin{bmatrix} 1 & 1 & 0 & 1 & 0 \\ 1 & 0 & 1 & 0 & 1 \end{bmatrix}$ | $\begin{bmatrix} 1 & 0 & 1 & 0 & 1 \\ 0 & 1 & 0 & 1 & 1 \end{bmatrix}$ | $\begin{bmatrix} 0 & 1 & 0 & 1 & 1 \\ 1 & 0 & 1 & 1 & 0 \end{bmatrix}$ | $\begin{bmatrix} 1 & 0 & 1 & 1 & 0 \\ 0 & 1 & 1 & 0 & 1 \end{bmatrix}$ |

| Code rate | Puncturing Pattern for Fourth Retransmission | Puncturing Pattern for Fifth Retransmission | Puncturing Pattern for Sixth Retransmission | Puncturing Pattern for Seventh Retransmission |
|---|---|---|---|---|
| 2/3 | $\begin{bmatrix} 1 & 1 \\ 1 & 0 \end{bmatrix}$ | $\begin{bmatrix} 0 & 1 \\ 1 & 1 \end{bmatrix}$ | $\begin{bmatrix} 1 & 0 \\ 1 & 1 \end{bmatrix}$ | $\begin{bmatrix} 1 & 1 \\ 0 & 1 \end{bmatrix}$ |
| 3/4 | $\begin{bmatrix} 1 & 0 & 1 \\ 1 & 1 & 0 \end{bmatrix}$ | $\begin{bmatrix} 0 & 1 & 1 \\ 1 & 0 & 1 \end{bmatrix}$ | $\begin{bmatrix} 1 & 1 & 0 \\ 1 & 0 & 1 \end{bmatrix}$ | $\begin{bmatrix} 1 & 0 & 1 \\ 0 & 1 & 1 \end{bmatrix}$ |
| 5/6 | $\begin{bmatrix} 0 & 1 & 1 & 0 & 1 \\ 1 & 1 & 0 & 1 & 0 \end{bmatrix}$ | $\begin{bmatrix} 0 & 1 & 0 & 1 & 1 \\ 1 & 0 & 1 & 0 & 1 \end{bmatrix}$ | $\begin{bmatrix} 1 & 0 & 1 & 0 & 1 \\ 0 & 1 & 0 & 1 & 1 \end{bmatrix}$ | $\begin{bmatrix} 1 & 1 & 0 & 1 & 0 \\ 1 & 0 & 1 & 0 & 1 \end{bmatrix}$ | pattern for the sixth retransmission is [1, 1, 0; 1, 0, 1], and a puncturing pattern for the seventh retransmission is [1, 0, 1; 0, 1, 1].

When the code rate is 5/6, a puncturing pattern for the initial transmission is [1, 1, 0, 1, 0; 1, 0, 1, 0, 1], and a puncturing pattern for the first retransmission is [1, 0, 1, 0, 1; 0, 1, 0, 1, 1]. Further, a puncturing pattern for the second retransmission is [0, 1, 0, 1, 1; 1, 0, 1, 1, 0], and a puncturing pattern for the third retransmission is [1, 0, 1, 1, 0; 0, 1, 1, 0, 1]. A puncturing pattern for the fourth retransmission is [0, 1, 1, 0, 1; 1, 1, 0, 1, 0], and a puncturing pattern for the fifth retransmission is [0, 1, 0, 1, 1; 1, 0, 1, 0, 1]. A puncturing pattern for the sixth retransmission is [1, 0, 1, 0, 1; 0, 1, 0, 1, 1], and a puncturing pattern for the seventh retransmission is [1, 1, 0, 1, 0; 1, 0, 1, 0, 1].

According to another embodiment, the transmitting STA 110 (or 120) may select and transmit a puncturing pattern for every transmission without using a preset puncturing pattern in order. When the preset puncturing patterns are not used in order, the transmitting STA 110 (or 120) may need to inform the receiving STA 120 (or 110) of information on the used puncturing patterns.

When using a puncturing pattern preset according to the transmission order, the receiving STA 120 (or 110) may receive the initially transmitted data field but may be able to transmit ACK/NACK to the transmitting STA 110 (or 120). For example, the receiving STA 120 (or 110) may have received the data field, but it may not recognize that the PPDU including the corresponding data field is a PPDU for itself. Alternatively, the receiving STA 120 (or 110) may not receive the PPDU including the data field. For example, the transmitting STA 110 (or 120) may transmit the PPDU, but the PPDU may not be delivered to the receiving STA 120 (or 110). If the PPDU is not transmitted to the receiving STA 120 (or 110) or the ACK/NACK transmitted by the receiving STA 120 (or 110) is not delivered to the transmitting STA 110 (or 120), the transmitting STA 110 (or 120) may retransmit the data field after a preset time (e.g., a time-out period). In such a case, the transmitting STA 110 (or 120) may transmit the data field using a puncturing pattern used for retransmission. However, the receiving STA 120 (or 110) may misunderstand the initial transmission and perform decoding based on the puncturing pattern used for the initial transmission. Since the receiving STA 120 (or 110) may decode the data field to which the puncturing pattern according to the retransmission is applied based on the puncturing pattern according to the initial transmission, an error may occur. The receiving STA 110 (or 120) may decode the data field to which the puncturing pattern for the retransmission is applied based on the puncturing pattern for the initial transmission, and in this case, an error may occur.

Or, for example, when the transmitting STA 110 (or 120) does not receive the ACK/NACK, a puncturing pattern used for the initial transmission may be used. However, when the receiving STA 120 (or 110) receives the PPDU, but the ACK/NACK transmitted by the receiving STA 120 (or 110) is not transmitted to the transmitting STA 110 (or 120), the transmitting STA 110 (or 120) may retransmit the data field using the puncturing pattern used for the initial transmission. Also, the receiving STA 120 (or 110) may decode the data field using the puncturing pattern used for the retransmission. For example, when the receiving STA 120 (or 110) receives the PPDU and recognizes that the corresponding PPDU is a PPDU for itself through address information, etc., the receiving STA 120 (or 110) may still fail to decode the data field included in the corresponding PPDU. In this case, the receiving STA 120 (or 110) may transmit a NACK for the data field to the transmitting STA 110 (or 120), and the transmitting STA 110 (or 120) may fail to receive the NACK. The transmitting STA 110 (or 120) that have not received the ACK/NACK may transmit the data field using the puncturing pattern used for the initial transmission, and the receiving STA 120 (or 110) may attempt to decode the data field by using the puncturing pattern used for the retransmission. In such a case, a decoding error in the receiving STA 120 (or 110) may occur.

Hereinafter, when transmitting the data field, a method of transmitting information related to the order in which the corresponding data field is transmitted will be described.

TABLE 6

| The number of transmission or puncturing pattern index | Bit indication | Puncturing pattern or redundancy version | Description |
| --- | --- | --- | --- |
| 1 | 00 | 1 | For the first transmission or first puncturing pattern |
| 2 | 01 | 2 | For th second transmission or second puncturing pattern |
| 3 | 10 | 3 | For the third transmission or third puncturing pattern |
| 4 | 11 | 4 | For the fourth transmission and fourth puncturing pattern |

Table 6 shows an embodiment of a method of notifying information related to a puncturing pattern.

Referring to Table 6, an allocated bit value may vary according to a puncturing pattern or a redundancy version. For example, the allocated bit value may be '00' for the initial transmission, '01' for the first retransmission, '10' for the second retransmission, and '11' for the third retransmission. Or, for example, the assigned bit value is '00' when the first puncturing pattern is used, '01' when the second puncturing pattern is used, '10' when the third puncturing pattern is used, and '11' when the fourth puncturing pattern is used.

A puncturing pattern in Table 6 may be used when the maximum number of transmissions is four (e.g., the total number of transmissions including the initial transmission and the retransmission is four). For example, the puncturing pattern set may consist of four puncturing patterns. Information related to the puncturing pattern may be included in a PHY header. For example, information related to which puncturing pattern is used may be included in the SIG field (e.g., EHT-SIG field). For example, when four puncturing patterns are used, information related to which puncturing pattern is used may be represented using 2 bits. When the maximum number of transmissions is different, a different number of puncturing patterns may be used. The maximum number of transmissions and the number of puncturing patterns are not limited to the above embodiment. A method of transmitting information related to which puncturing pattern is used according to the maximum number of transmissions or the number of puncturing patterns may be extended.

A method of determining a puncturing pattern and a method of transmitting information related to which puncturing pattern is used may be used together.

Figure 26:
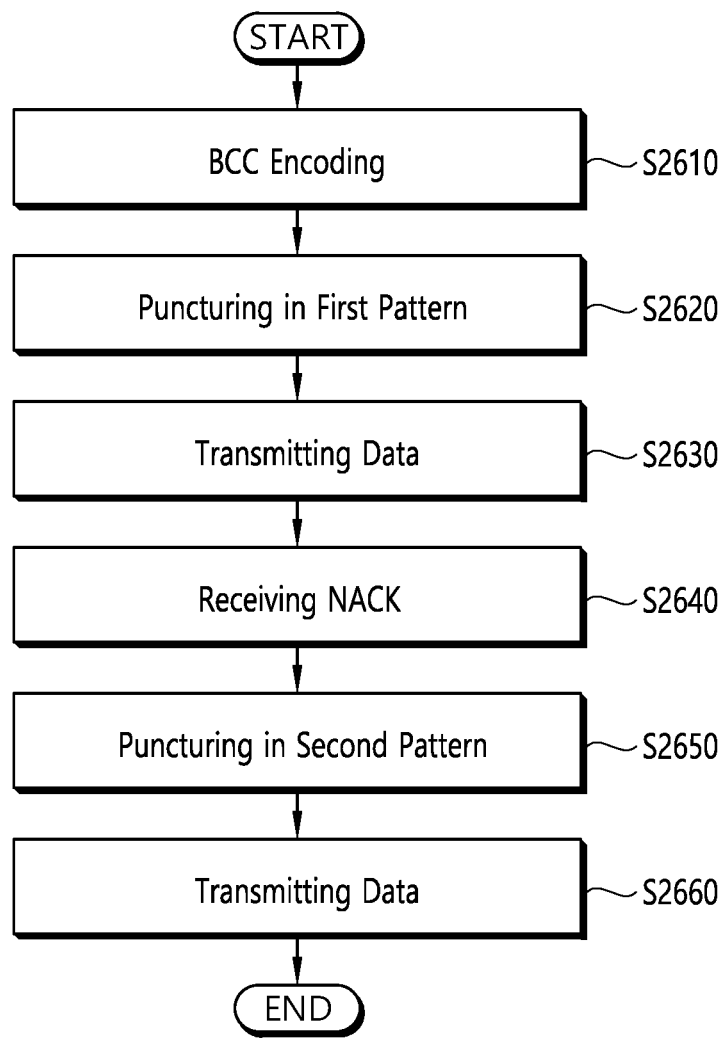
FIG. 26 is a flowchart for explaining an embodiment of the operation of the transmitting STA 110 or 120.

FIG. 26 is a flowchart for explaining an embodiment of the operation of the transmitting STA 110 or 120.

Referring to FIG. 26, the transmitting STA 110 (or 120) may perform a BCC encoding on the data field (S2610). For example, the transmitting STA 110 (or 120) may perform the BCC encoding as shown in FIG. 22.

The transmitting STA 110 (or 120) may puncture the encoded data field in the first pattern (S2620). For example, the transmitting STA 110 (or 120) may puncture the BCC encoded data field based on to a code rate (e.g., 2/3, 3/4, 5/6, etc.). For example, the first pattern may be determined based on the 'puncturing pattern for initial transmission' in Tables 3 to 5.

The transmitting STA 110 (or 120) may transmit the data field punctured in the first pattern and control information related to the first pattern, as shown in step S2630. A signal transmitted by the transmitting STA through step S2630 may be included in the transmission PPDU, and an example of the transmission PPDU may be as shown in FIG. 18. For example, the transmission signal (e.g., transmission PPDU) related to S2630 may include identification information for the receiving STA. For example, the identification information for the receiving STA may be all or some bits of the AID of the receiving STA, all or some bits of the MAC ID, and the like. The transmitting STA may insert identification information for the receiving STA into the transmission signal in various ways. For example, identification information on the receiving STA may be inserted into the information bit of the signal field (e.g., SIG-A, SIG-B, etc.) of FIG. 18. That is, the information bit of the signal field (e.g., SIG-A, SIG-B, etc.) of FIG. 18 may include a subfield related to the identification information of the receiving STA. Alternatively, all or part of the information bits (e.g., CRC bits) of the signal field (e.g., SIG-A, SIG-B, etc.) of FIG. 18 may be scrambled with the identification information of the receiving STA. For example, all/part of the signal field may be scrambled with the identification information of the receiving STA based on an XOR operation or the like.

The transmitting STA 110 (or 120) may receive a NACK from the receiving STA 120 (or 110), as shown in step S2640.

The transmitting STA 110 (or 120) may puncture the data field in the second pattern (S2650). For example, the transmitting STA 110 (or 120) may puncture the BCC encoded data field based on a code rate (e.g., a code rate used for the initial transmission). For example, the second pattern may be determined based on the 'puncturing pattern for n-th retransmission' of Tables 3 to 5.

The transmitting STA 110 (or 120) may retransmit the data field punctured in the second pattern and control information related to the second pattern as shown in step S2660.

Some of the detailed steps shown in the example of FIG. 26 may be omitted. For example, the transmitting STA 110 (or 120) may perform only steps S2610, S2620, and S2630. Or, for example, the transmitting STA 110 (or 120) may perform only steps S2610, S2620, S2630, S2650, and S2660.

Figure 27:
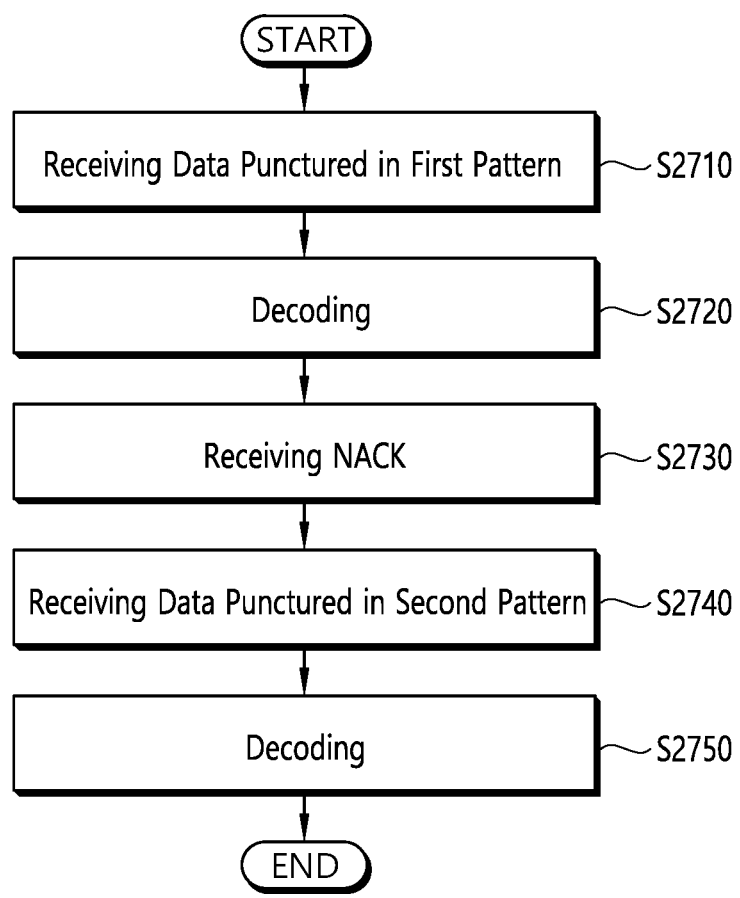
FIG. 27 is a flowchart for explaining an embodiment of the operation of the receiving STA 120 or 110.

FIG. 27 is a flowchart for explaining an embodiment of the operation of the receiving STA 120 or 110.

Referring to FIG. 27, the receiving STA 120 (or 110) may receive data punctured in a first pattern and control information related to the first pattern, as shown in step S2710. For example, the first pattern may be determined based on the 'puncturing pattern for initial transmission' of Tables 3 to 5.

The receiving STA 120 (or 110) may decode the data punctured in the first pattern as shown in step S2720. The example of FIG. 27 may further include various steps not shown. For example, the receiving STA may obtain an identifier included in the received signal and may perform a subsequent decoding operation only when the obtained identifier matches the identifier of the receiving STA. As described in FIG. 26, the signal transmitted by the transmitting STA may include identification information for the receiving STA in various ways. As described above, all or part of the information bits (e.g., CRC bits) of the signal field (e.g., SIG-A, SIG-B, etc.) may be scrambled with the identification information of the receiving STA. The receiving STA may obtain the intended identifier of the receiving STA based on a specific bit/field of the received signal and may perform a subsequent decoding operation only when the obtained identifier matches the identifier of the receiving STA.

The receiving STA 120 (or 110) may transmit a NACK when it fails to decode (S2730). The receiving STA 120 (or 110) may receive data punctured in the second pattern and control information related to the second pattern as shown in step S2740. For example, the second pattern may be determined based on the 'puncturing pattern for n-th retransmission' of Tables 3 to 5.

The receiving STA 120 (or 110) may decode the punctured data in the second pattern as shown in step S2750.

Some of the detailed steps shown in the example of FIG. 27 may be omitted. For example, the receiving STA 120 (or 110) may perform only steps S2710 and S2720. Or, for example, the receiving STA 120 (or 110) may perform only steps S2710, S2720, S2740, and S2750.

When the embodiment is implemented in software, the above-described technique may be implemented as a module (process, function, etc.) that performs the above-described function. A module may be stored in a memory and executed by a processor. The memory may be internal or external to the processor and may be coupled to the processor by various well-known means.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function.

The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:
    performing, by a station (STA), a binary convolutional code (BCC) encoding on a data field
    puncturing, by the STA, the data field in a first pattern; and
    transmitting, by the STA, a physical protocol data unit (PPDU) including a first control field and a data field punctured in the first pattern, wherein the first control field includes control information related to the first pattern,
    wherein the data field punctured in the first pattern has a code rate of one of 2/3, 3/4, or 5/6,
    wherein based on a maximum number of transmissions being 2 and the code rate being 2/3, the first pattern for initial transmission is [1, 1; 1, 0], and the first pattern for retransmission is [0, 1; 1, 1],
    wherein based on a maximum number of transmissions being 2 and the code rate being 3/4, the first pattern for initial transmission is [1, 1, 0; 1, 0, 1], and the first pattern for retransmission is [1, 0, 1; 0, 1, 1],
    wherein based on a maximum number of transmissions being 2 and the code rate being 5/6, the first pattern for initial transmission is [1, 1, 0, 1, 0; 1, 0, 1, 0, 1], and the first pattern for retransmission is [1, 0, 1, 0, 1; 0, 1, 0, 1, 1],
    wherein upon the retransmission, a punctured bit for the initial transmission is not be punctured, and a bit furthest from the punctured bit for the initial transmission is punctured,
    wherein a matrix [a, b; c, d] represents a matrix having an element 'a' in a first row and a first column, an element 'b' in the first row and a second column, an element 'c' in a second row and the first column, and an element 'd' in the second row and the second column,
    wherein a value '1' means a bit that is not punctured but is bypassed and transmitted, and
    wherein a value '0' means a bit that is punctured and not transmitted.

2. The method of claim 1, further comprising:
    puncturing, by the STA, the data field in a second pattern; and
    transmitting, by the STA, a PPDU including a second control field and a data field punctured in the second pattern, wherein the second control field includes control information related to the second pattern.

3. The method of claim 1, wherein the second pattern is determined based on the first pattern.

4. The method of claim 1, wherein the control field is a signal (SIG) field of the PPDU.

5. A station (STA) in a wireless local area network (WLAN) system, the STA comprising:
    a transceiver configured to transmit and/or receive a wireless signal; and
    a processor coupled to the transceiver,
    wherein the processor is configured for:
        performing a binary convolutional code (BCC) encoding on a data field puncturing the data field in a first pattern; and
        transmitting a physical protocol data unit (PPDU) including a first control field and a data field punctured in the first pattern, wherein the first control field includes control information related to the first pattern, wherein the data field punctured in the first pattern has a code rate of one of 2/3, 3/4, or 5/6, wherein based on a maximum number of transmissions being 2 and the code rate being 2/3, the first pattern for initial transmission is [1, 1; 1, 0], and the first pattern for retransmission is [0, 1; 1, 1], wherein based on a maximum number of transmissions being 2 and the code rate being 3/4, the first pattern for initial transmission is [1, 1, 0; 1, 0, 1], and the first pattern for retransmission is [1, 0, 1; 0, 1, 1], wherein based on a maximum number of transmissions being 2 and the code rate being 5/6, the first pattern for initial transmission is [1, 1, 0, 1, 0; 1, 0, 1, 0, 1], and the first pattern for retransmission is [1, 0, 1, 0, 1; 0, 1, 0, 1, 1], wherein upon the retransmission, a punctured bit for the initial transmission is not be punctured, and a bit furthest from the punctured bit for the initial transmission is punctured, wherein a matrix [a, b; c, d] represents a matrix having an element 'a' in a first row and a first column, an element 'b' in the first row and a second column, an element 'c' in a second row and the first column, and an element 'd' in the second row and the second column, wherein a value '1' means a bit that is not punctured but is bypassed and transmitted, and wherein a value '0' means a bit that is punctured and not transmitted.

6. The STA of claim 5, wherein the processor is further configured for:

puncturing the data field in a second pattern; and transmitting a PPDU including a second control field and a data field punctured in the second pattern, wherein the second control field includes control information related to the second pattern.

7. The STA of claim 5, wherein the second pattern is determined based on the first pattern.

8. The STA of claim 5, wherein the control field is a signal (SIG) field of the PPDU.

* * * * *